United States Patent
Alvarado et al.

(10) Patent No.: US 10,844,274 B2
(45) Date of Patent: Nov. 24, 2020

(54) ORGANIC ACID-BASED ENHANCED WATERFLOODING

(71) Applicant: UNIVERSITY OF WYOMING, Laramie, WY (US)

(72) Inventors: Vladimir Alvarado, Laramie, WY (US); Teresa Reilly, Laramie, WY (US); Kelly Meyers, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 16/386,045

(22) Filed: Apr. 16, 2019

(65) Prior Publication Data

US 2019/0316026 A1 Oct. 17, 2019

Related U.S. Application Data

(60) Provisional application No. 62/659,029, filed on Apr. 17, 2018.

(51) Int. Cl.
*E21B 43/20* (2006.01)
*C09K 8/584* (2006.01)
*C09K 8/588* (2006.01)

(52) U.S. Cl.
CPC .............. *C09K 8/584* (2013.01); *C09K 8/588* (2013.01); *E21B 43/20* (2013.01)

(58) Field of Classification Search
CPC .......... C09K 8/584; C09K 8/588; E21B 43/20
See application file for complete search history.

(56) References Cited

U.S. PATENT DOCUMENTS

| | | | | |
|---|---|---|---|---|
| 3,933,204 A | * | 1/1976 | Knapp | C09K 8/5755 166/295 |
| 4,000,781 A | * | 1/1977 | Knapp | C09K 8/502 166/276 |
| 4,352,396 A | * | 10/1982 | Friedman | C09K 8/502 166/295 |
| 2011/0220359 A1 | * | 9/2011 | Soliman | C09K 8/88 166/305.1 |
| 2013/0150269 A1 | * | 6/2013 | Weerasooriya | E21B 43/16 507/261 |

OTHER PUBLICATIONS

H. Princen, I. Zia, and S. Mason. Measurement of interfacial tension from the shape of a rotating drop. Journal of colloid and interface science, 23(1):99-107, 1967.

(Continued)

*Primary Examiner* — Silvana C Runyan
(74) *Attorney, Agent, or Firm* — Patterson + Sheridan, LLP

(57) ABSTRACT

In an embodiment, a hydrocarbon recovery material includes an organic acid and a water material, the organic acid including a naphthenic acid, L-prolific, or a combination thereof. In another embodiment, an oil recovery method includes injecting a treatment fluid into a reservoir under reservoir conditions, the reservoir containing hydrocarbons, and the treatment fluid includes an organic acid and a water material. In another embodiment, an oil recovery method includes injecting a treatment fluid into a reservoir containing hydrocarbons, the treatment fluid comprising an organic acid in one or more of an oil-in-water emulsion, a resin dispersion, or a polymer capsule.

20 Claims, 16 Drawing Sheets

(56) References Cited

OTHER PUBLICATIONS

H. Pu, X. Xie, P. Yin, N. R. Morrow, et al. Low-salinity waterflooding and mineral dissolu-tion. In SPE annual technical conference and exhibition. Society of Petroleum Engineers, 2010.

W. Qiao, Y. Cui, Y. Zhu, and H. Cai. Dynamic interfacial tension behaviors between guerbet betaine surfactants solution and daqing crude oil. Fuel, 102:746-750, 2012.

T. Reilly. Investigation of the Molecular Basis of Chemical Enhanced Oil Recovery Fluid-fluid Interactions Through NMR Spectroscopy. University of Wyoming, 2017.

H. Hu et al., Evolution of a Liquid Drop in a Spinning Drop Tensiometer, Journal of Colloid and Interface Science 162, 331-339 (1994).

A. RezaeiDoust, T. Puntervold, S. Strand, and T. Austad. Smart water as wettability mod-ifier in carbonate and sandstone: A discussion of similarities/differences in the chemical mechanisms. Energy & fuels, 23(9):4479-4485, 2009.

S. Rivet, L. W. Lake, G. A. Pope, et al. A coreflood investigation of low-salinity enhanced oil recovery. In SPE Annual Technical Conference and Exhibition. Society of Petroleum Engineers, 2010.

D. Rosenthal. The shape and stability of a bubble at the axis of a rotating liquid. Journal of Fluid Mechanics, 12(3):358-366, 1962.

K. Sandengen, A. Kristoffersen, K. Melhuus, L. O. Jøsang, et al. Osmosis as mechanism for low-salinity enhanced oil recovery. SPE Journal, 21(04):1-227, 2016.

E. Scholten, L. M. Sagis, and E. van der Linden. Effect of permeability on aqueous biopolymer interfaces in spinning drop experiments. Biomacromolecules, 7(7):2224-2229, 2006.

J. Sheng. Modern chemical enhanced oil recovery: theory and practice. Gulf Professional Publishing, 2010.

J. Sheng. Critical review of low-salinity waterflooding. Journal of Petroleum Science and Engineering, 120:216-224, 2014.

J. C. Slattery, J.-D. Chen, C. P. Thomas, and P. D. Fleming III. Spinning drop interfacial viscometer. Journal of Colloid and Interface Science, 73(2):483-499, 1980.

G.-Q. Tang and N. R. Morrow. Influence of brine composition and fines migration on crude oil/brine/rock interactions and oil recovery. Journal of Petroleum Science and Engineering, 24(2-4):99-111, 1999.

J. T. Tetteh, E. Rankey, R. Barati, et al. Low salinity waterflooding effect: crude oil/brine interactions as a recovery mechanism in carbonate rocks. In OTC Brasil. Offshore Tech-nology Conference, 2017.

S. Vandebril, A. Franck, G. G. Fuller, P. Moldenaers, and J. Vermant. A double wall-ring geometry for interfacial shear rheometry. Rheologica Acta, 49(2):131-144, 2010.

C. Verdier, H. T. Vinagre, M. Piau, and D. D. Joseph. High temperature interfacial tension measurements of pa6/pp interfaces compatibilized with copolymers using a spinning drop tensiometer. Polymer, 41(17):6683-6689, 2000.

B. Vonnegut. Rotating bubble method for the determination of surface and interfacial ten-sions. Review of scientific instruments, 13(1):6-9, 1942.

Z. Yi, H. K. Sarma, et al. Improving waterflood recovery efficiency in carbonate reservoirs through salinity variations and ionic exchanges: A promising low-cost "smart-waterflood" approach. In Abu Dhabi International Petroleum Conference and Exhibition. Society of Petroleum Engineers, 2012.

A. Zahid, E. H. Stenby, A. A. Shapiro, et al. Improved oil recovery in chalk: wettability alteration or something else? In Spe Europec/eage Annual Conference and Exhibition. Society of Petroleum Engineers, 2010.

A. Zahid, A. Shapiro, A. Skauge, and E. Stenby. Smart waterflooding (high sal/low sal) in carbonate reservoirs (spe 154508). In 74th EAGE Conference and Exhibition incorporating EUROPEC 2012, 2012.

Y. Zhang, N. R. Morrow, et al. Comparison of secondary and tertiary recovery with change in injection brine composition for crude-oil/sandstone combinations. In SPE/DOE Sym-posium on Improved Oil Recovery. Society of Petroleum Engineers, 2006.

Y. Zhang, X. Xie, N. R. Morrow, et al. Waterflood performance by injection of brine with different salinity for reservoir cores. In SPE Annual Technical Conference and Exhibition. Society of Petroleum Engineers, 2007.

H. Aksulu, D. Hamsø, S. Strand, T. Puntervold, and T. Austad. Evaluation of low-salinity enhanced oil recovery effects in sandstone: Effects of the temperature and ph gradient. Energy & Fuels, 26(6):3497-3503, 2012.

V. Alvarado, G. Garcia-Olvera, P. Hoyer, T. E. Lehmann, et al. Impact of polar components on crude oil-water interfacial film formation: A mechanisms for low-salinity waterflooding. In SPE Annual Technical Conference and Exhibition. Society of Petroleum Engineers, 2014a.

V. Alvarado, M. Moradi Bidhendi, G. Garcia-Olvera, B. Morin, J. S. Oakey, et al. Interfacial visco-elasticity of crude oil-brine: An alternative eor mechanism in smart waterflooding. In SPE Improved Oil Recovery Symposium. Society of Petroleum Engineers, 2014b.

D. Arla, A. Sinquin, T. Palermo, C. Hurtevent, A. Graciaa, and C. Dicharry. Influence of ph and water content on the type and stability of acidic crude oil emulsions. Energy & fuels, 21(3):1337-1342, 2007.

N. Aske, R. Orr, and J. Sjöblom. Dilatational elasticity moduli of water-crude oil interfaces using the oscillating pendant drop. Journal of dispersion science and technology, 23(6): 809-825, 2002.

T. Austad. Water-based eor in carbonates and sandstones: New chemical understanding of the eor potential using "smart water". In Enhanced oil recovery Field case studies, pp. 301-335. Elsevier, 2013.

A. Barati-Harooni, A. Soleymanzadeh, A. Tatar, A. Najafi-Marghmaleki, S.-J. Samadi, A. Yari, B. Roushani, and A. H. Mohammadi. Experimental and modeling studies on the effects of temperature, pressure and brine salinity on interfacial tension in live oil-brine systems. Journal of Molecular Liquids, 219:985-993, 2016.

J. D. Berry, M. J. Neeson, R. R. Dagastine, D. Y. Chan, and R. F. Tabor. Measurement of surface and interfacial tension using pendant drop tensiometry. Journal of colloid and interface science, 454:226-237, 2015.

A. Bertheussen, S. Simon, and J. Sjöblom. Equilibrium partitioning of naphthenic acids and bases and their consequences on interfacial properties. Colloids and Surfaces A: Physicochemical and Engineering Aspects, 529:45-56, 2017.

J. Buckley and N. Morrow. Improved oil recovery by low salinity waterflooding: a mechanistic review. In 11th international symposium on evaluation of wettability and its effect on oil recovery, Calgary, pp. 6-9, 2010.

J. S. Buckley, T. Fan, et al. Crude oil/brine interfacial tensions1. Petrophysics, 48(03), 2007.

J. Cayias, R. Schechter, and W. Wade. The measurement of low interfacial tension via the spinning drop technique. Adsorption at interfaces, 8:234-247, 1975.

H.-L. Cheng and S. S. Velankar. Controlled jamming of particle-laden interfaces using a spinning drop tensiometer. Langmuir, 25(8):4412-4420, 2009.

J. S. Clemente and P. M. Fedorak. A review of the occurrence, analyses, toxicity, and biodegradation of naphthenic acids. Chemosphere, 60(5):585-600, 2005.

A. Fogden. Effect of water salinity and ph on the wettability of a model substrate. Energy & Fuels, 25(11):5113-5125, 2011.

S. Gao, K. Moran, Z. Xu, and J. Masliyah. Role of naphthenic acids in stabilizing water-in-diluted model oil emulsions. The Journal of Physical Chemistry B, 114(23):7710-7718, 2010.

G. Garcia-Olvera, V. Alvarado, et al. The potential of sulfate as optimizer of crude oil-water interfacial rheology to increase oil recovery during smart water injection in carbonates. In SPE Improved Oil Recovery Conference. Society of Petroleum Engineers, 2016a.

G. Garcia-Olvera, T. M. Reilly, T. E. Lehmann, and V. Alvarado. Effects of asphaltenes and organic acids on crude oil-brine interfacial visco-elasticity and oil recovery in low-salinity waterflooding. Fuel, 185:151-163, 2016b.

D. Green and G. Willhite. Enhanced oil recovery, vol. 6. SPE Textbook Series, TX, USA, 1998.

(56) References Cited

OTHER PUBLICATIONS

D. Harbottle, Q. Chen, K. Moorthy, L. Wang, S. Xu, Q. Liu, J. Sjoblom, and Z. Xu. Prob-lematic stabilizing films in petroleum emulsions: Shear rheological response of viscoelastic asphaltene films and the effect on drop coalescence. Langmuir, 30(23):6730-6738, 2014.

D. C. Harris. Quantitative chemical analysis. Macmillan, 2010.

T. E. Havre, J. Sjöblom, and J. E. Vindstad. Oil/water-partitioning and interfacial behavior of naphthenic acids. Journal of dispersion science and technology, 24(6):789-801, 2003.

P. Hoyer and V. Alvarado. Stability of liquid bridges with elastic interface. RSC Advances, 7(78):49344-49352, 2017.

P. Hoyer, V. Alvarado, and M. Carvalho. Snap-off in constricted capillary with elastic interface. Physics of Fluids, 28(1):012104, 2016.

J. C. Hsu and R. W. Flumerfelt. Rheological applications of a drop elongation experiment. Transactions of the Society of Rheology, 19(4):523-540, 1975.

M. Husmann, H. Rehage, E. Dhenin, and D. Barth'es-Biesel. Deformation and bursting of nonspherical polysiloxane microcapsules in a spinning-drop apparatus. Journal of colloid and interface science, 282(1):109-119, 2005.

P. Jadhunandan and N. Morrow. Spontaneous imbibition of water by crude oil/brine/rock systems. In Situ; (United States), 15.

P. Jadhunandan, N. R. Morrow, et al. Effect of wettability on waterflood recovery for crude-oil/brine/rock systems. SPE reservoir engineering, 10(01):40-46, 1995.

D. D. Joseph. Evolution of a liquid drop in a spinning drop tensiometer. Journal of colloid and interface science, 162:331-339, 1994.

M. Khishvand, A. Alizadeh, and M. Piri. In-situ characterization of wettability and pore-scale displacements during two- and three-phase flow in natural porous media. Advances in water resources, 97:279-298, 2016.

S. L. Kokal et al. Crude oil emulsions: A state-of-the-art review. SPE Production & facilities, 20(01):5-13, 2005.

A. Lager, K. J. Webb, C. Black, M. Singleton, K. S. Sorbie, et al. Low salinity oil recovery—an experimental investigation 1. Petrophysics, 49(01), 2008.

L. W. Lake et al. Enhanced oil recovery. 1989.

L. Lashkarbolooki and S. Ayatollahi. Experimental and modeling investigation of dynamic interfacial tension of asphaltenic-acidic crude oil/aqueous phase containing different ions. Chinese Journal of Chemical Engineering, 25(12):1820-1830, 2017.

L. Liggieri and R. Miller. Interfacial rheology. CRC Press, 2009.

D. J. Ligthelm, J. Gronsveld, J. Hofman, N. Brussee, F. Marcelis, H. van der Linde, et al. Novel waterflooding strategy by manipulation of injection brine composition. In EU-ROPEC/EAGE conference and exhibition. Society of Petroleum Engineers, 2009.

C. W. Macosko and R. G. Larson. Rheology: principles, measurements, and applications. 1994.

P. McGuire, J. Chatham, F. Paskvan, D. Sommer, F. Carini, et al. Low salinity oil recovery: An exciting new eor opportunity for alaska's north slope. In SPE Western Regional Meeting. Society of Petroleum Engineers, 2005.

D. Mobius and R. Miller. Drops and bubbles in interfacial research, vol. 6. Elsevier, 1997.

L. Mondy, C. Brooks, A. Grillet, H. Moffat, T. Koehler, M. Yaklin, M. Reichert, L. Walker, R. Cote, and J. Castañeda. Surface rheology and interface stability. Albuquerque, NM: Sandia National Laboratories, 2010.

L. Moradi and V. Alvarado. Influence of aqueous-phase ionic strength and composition on the dynamics of water-crude oil interfacial film formation. Energy & Fuels, 30(11): 9170-9180, 2016.

M. Moradi, E. Topchiy, T. E. Lehmann, and V. Alvarado. Impact of ionic strength on partitioning of naphthenic acids in water-crude oil systems-determination through high-field nmr spectroscopy. Fuel, 112:236-248, 2013.

B. Morin, Y. Liu, V. Alvarado, and J. Oakey. A microfluidic flow focusing platform to screen the evolution of crude oil-brine interfacial elasticity. Lab on a Chip, 16(16):3074-3081, 2016.

R. A. Nasralla, H. A. Nasr-El-Din, et al. Impact of electrical surface charges and cation exchange on oil recovery by low salinity water. In SPE Asia Pacific Oil and Gas Conference and Exhibition. Society of Petroleum Engineers, 2011.

J.-A. Östlund, M. Nydén, I. H. Auflem, and J. Sjöblom. Interactions between asphaltenes and naphthenic acids. Energy & Fuels, 17(1):113-119, 2003.

A. E. Outlook. With projects to 2050. Washington, DC: US Energy Information Adminis-tration, 2017.

N. Passade-Boupat, M. Rondon Gonzalez, C. Hurtevent, B. Brocart, T. Palermo, et al. Risk assessment of calcium naphtenates and separation mechanisms of acidic crude oil. In SPE International Conference on Oilfield Scale. Society of Petroleum Engineers, 2012.

H. Patterson, K. Hu, and T. Grindstaff. Measurement of interfacial and surface tensions in polymer systems. In Journal of Polymer Science Part C: Polymer Symposia, vol. 34, pp. 31-43. Wiley Online Library, 1971.

G. Pieper, H. Rehage, and D. Barth'es-Biesel. Deformation of a capsule in a spinning drop apparatus. Journal of colloid and interface science, 202(2):293-300, 1998.

S. Poteau, J.-F. Argillier, D. Langevin, F. Pincet, and E. Perez. Influence of ph on stability and dynamic properties of asphaltenes and other amphiphilic molecules at the oil-water interface. Energy & Fuels, 19(4):1337-1341, 2005.

D. Green and G. Willhite. Enhanced oil recovery, vol. 6. SPE Textbook Series, TX, USA, 1998, pp. 12-72.

D. C. Harris. Quantitative chemical analysis. Macmillan, 2010, pp. 117-141.

L. Liggieri and R. Miller. Interfacial Rheology. CRC Press, 2009, pp. 137-177.

J. Sheng. Modern chemical enhanced oil recovery: theory and practice. Gulf Professional Publishing, 2010, pp. 396-398.

* cited by examiner

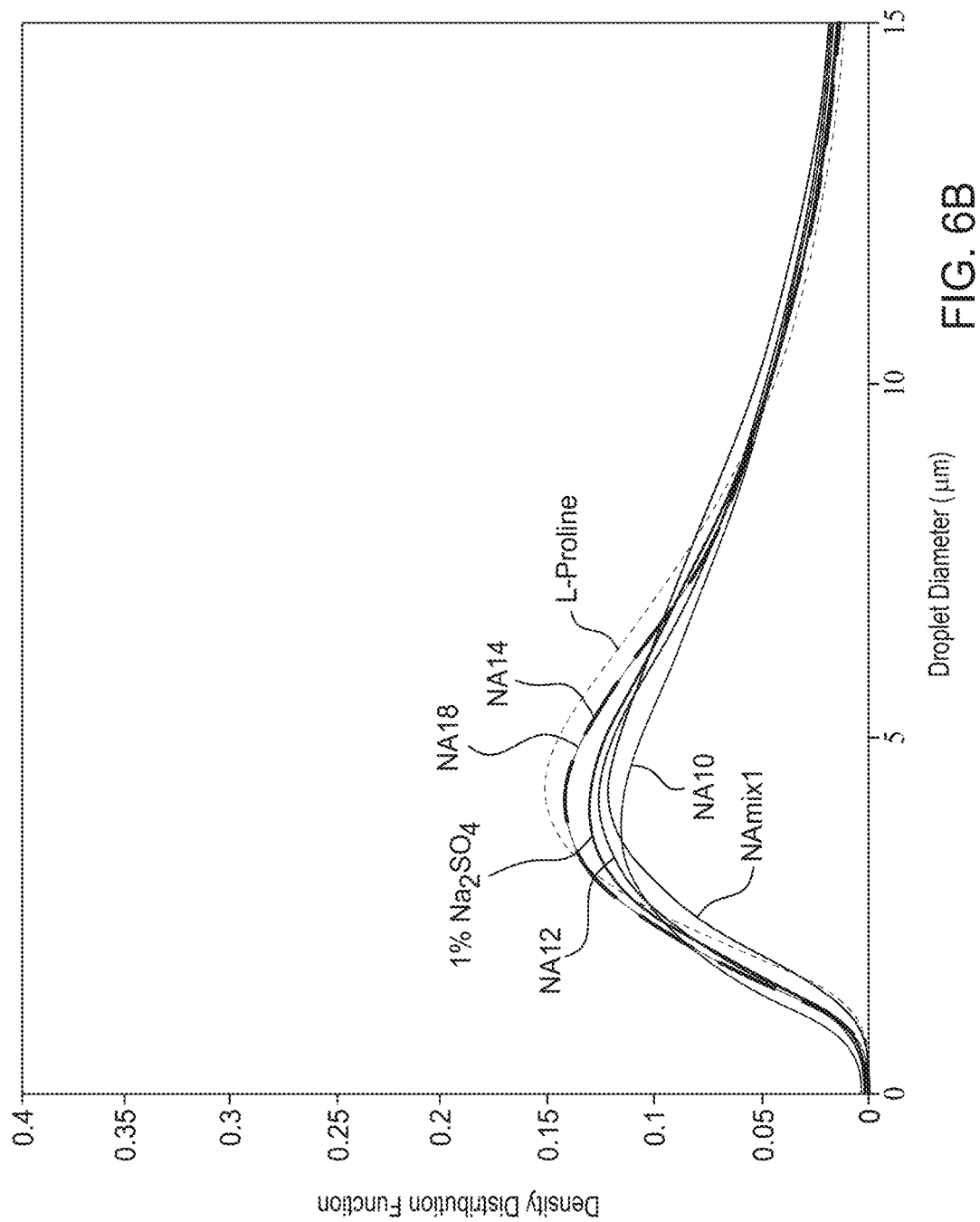

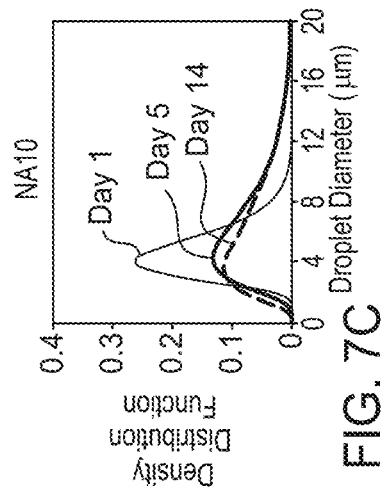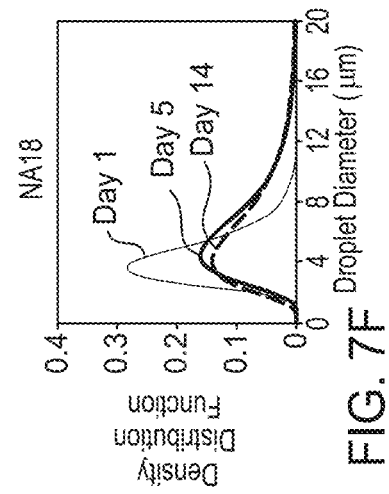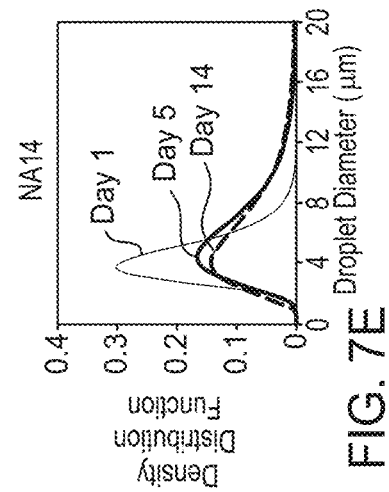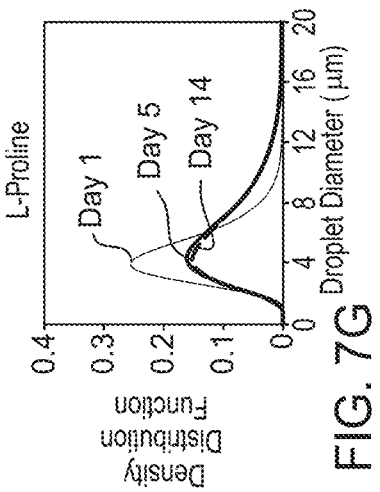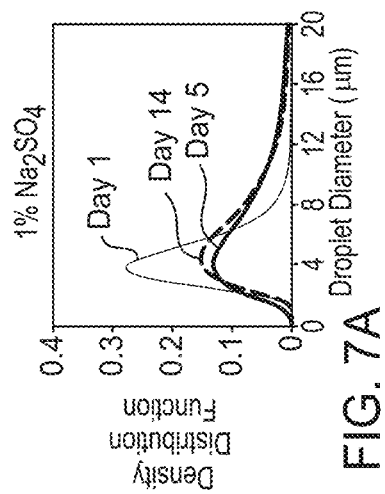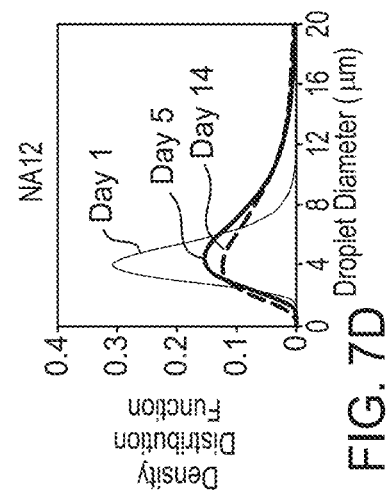

ORGANIC ACID-BASED ENHANCED WATERFLOODING

CROSS-REFERENCE TO RELATED APPLICATIONS

This application claims priority to U.S. Provisional Patent Application No. 62/659,029, filed Apr. 17, 2018, the entirety of which is herein incorporated by reference.

BACKGROUND

Field

Embodiments of the present disclosure generally relate to methods for enhanced oil recovery. More specifically, embodiments described herein relate to organic acid-based enhanced waterflooding.

Description of the Related Art

Oil recovery is typically dictated by brine, oil, and rock interactions. Injection of low-salinity brine, regardless of whether the brine is the connate or the injection water, has been shown to improve oil recovery in sandstone reservoirs. Several mechanisms for this improvement have been suggested, but in large part, the observed wettability alteration towards more water-wetness is credited for the enhancement in oil recovery. Alteration of the rock surface wetting condition occurs as the rock is exposed (e.g., aged) for extended periods of time (e.g., weeks) in the presence of high water saturation. Wettability alteration as a mechanism for improved oil recovery has been investigated over the years, yet no framework exists to date which fully explains all experimental observations and improved materials for enhanced oil recovery.

Water-in-oil emulsion's stability, another element in improved recovery, can be dictated by the formation of a viscoelastic interfacial film. Stable emulsions can be problematic because emulsions represent one species trapped in another, and therefore inhibit attempts to separate into two individual phases. Viscoelasticity increases generally correlate with a delay in snap-off and an increase in emulsion coalescence in porous media. Snap-off may be described as the separation (pinch off) of the oil phase into a droplet or oil ganglion during water imbibition in a water-wet constriction. Emulsion coalescence and snap-off delay are related to connectivity in the medium, which renders a more mobilized fluid; however, challenges remain in forming a mobilized fluid with improved connectivity.

Thus, what is needed in the art are improved methods and materials for enhanced oil recovery. More specifically, what is needed in the art are materials and methods for organic acid-based waterflooding.

SUMMARY

In an embodiment, a hydrocarbon recovery material includes an organic acid and a water material, the organic acid including a naphthenic acid, L-proline, or a combination thereof.

In another embodiment, an oil recovery method includes injecting a treatment fluid into a reservoir under reservoir conditions, the reservoir containing hydrocarbons, and the treatment fluid includes an organic acid and a water material.

In another embodiment, an oil recovery method includes injecting a treatment fluid into a reservoir containing hydrocarbons, the treatment fluid comprising an organic acid in one or more of an oil-in-water emulsion, a resin dispersion, or a polymer capsule.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 6B shows density distribution functions for example acids at 1 mM concentration on day 14 according to some embodiments.

FIGS. 7A-7G show density distribution function as a function of droplet diameter for the example acids at day 1, day 5, and day 14 according to some embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
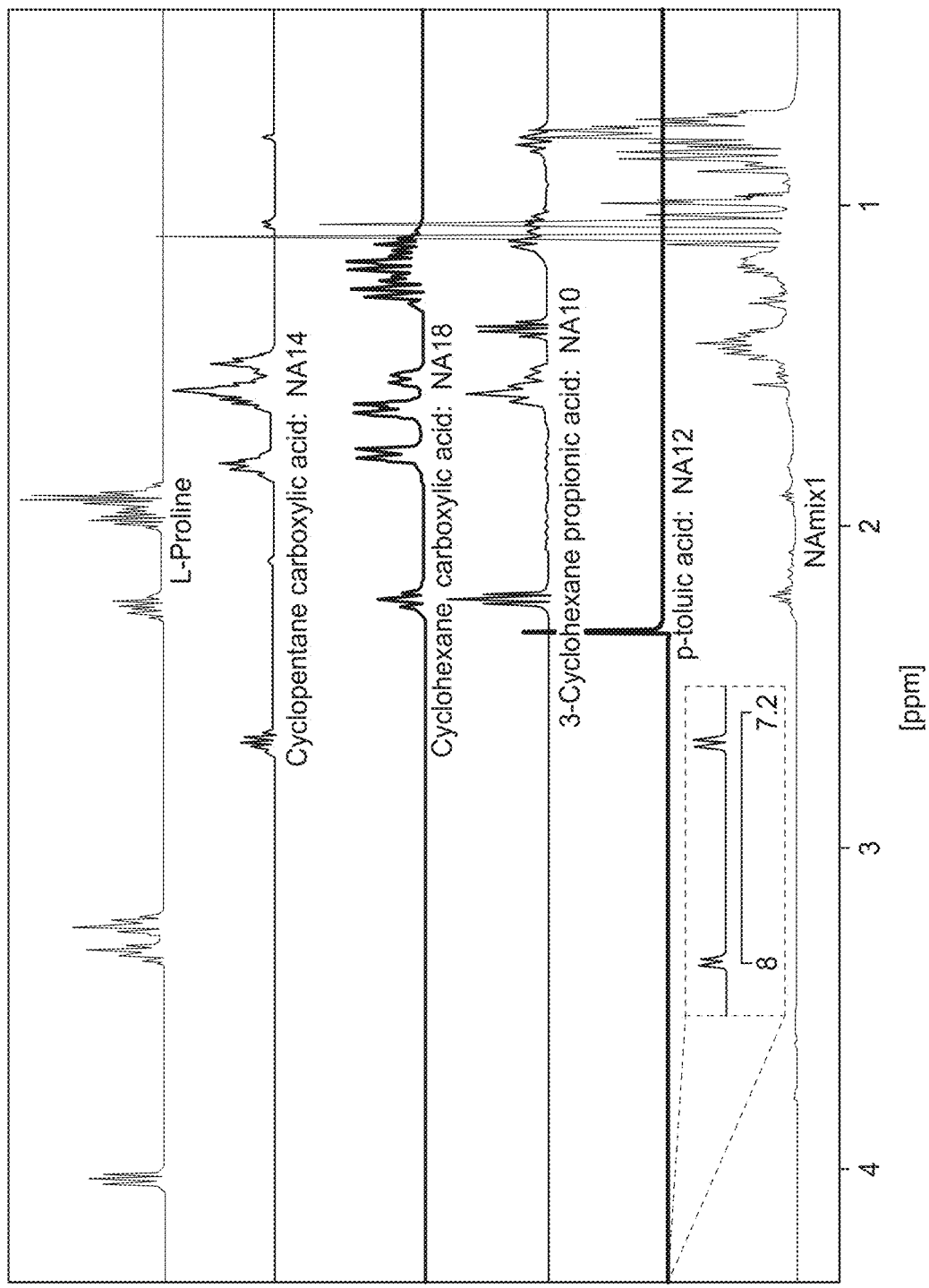
FIG. 1 shows 1D Proton Nuclear Magnetic Resonance ($^1$H NMR) spectra for example acids described herein according to some embodiments.

Embodiments described herein relate to organic acids, or the like, which provide for improved oil recovery. The inventors have surprisingly discovered that several organic acids (e.g., naphthenic acids, L-proline, etc.) are working at the interface to elicit an opportunistic interfacial response. The possibility that acids could be beneficial in eliciting an interfacial response is surprising because acids are typically associated with stabilizing emulsions and stable emulsions lead to less oil recovery. The structure of the organic acids is related to the interfacial rheological behavior of the system. Oil recovery can be improved through manipulation of fluid-fluid interactions alone, and the observed behavior for these organic acids is believed to enable utilization of various compounds for use in enhanced oil recovery (EOR). In some embodiments the interfacial response can be generated by one or more organic acids (e.g., cyclopentane carboxylic acid, cyclohexane carboxylic acid, 3-cyclohexane propionic acid, p-toluic acid, L-proline, a mixture of naphthenic acids, or a combination thereof).

In some embodiments, organic acids, such as various cycloalkane carboxylic acids, are assessed for their ability to beneficially impact the interface between oil and water; their impact on the stability of emulsions and potential to delay snap-off is determined, as is their impact on the interfacial viscoelasticity. The cyclopentanes investigated showed a tendency to repair the interface after rupture, suggesting potential to regain connectivity in a reservoir after it has been immobilized. In some embodiments, the enhanced oil recovery (EOR) materials described herein are utilized for destabilizing emulsions, maintaining mobilized fluid in the reservoir, and then re-establishing oil connectivity after it has been lost in reservoir. Various benefits of the embodiments described herein include the low concentrations of material utilized to improve the probability of oil recovery. The organic acids can be directly dissolved in injection water for waterflooding or delivered through encapsulation methods such as suspension in oil-in-water emulsions, resin dispersions, and polymer delivery capsules, among other possibilities.

The structural trends described herein indicate that the branched cyclohexane carboxylic acids can work to destabilize emulsions through coalescence and improved oil connectivity in porous media. The structural trends described herein also indicate that cyclopentane carboxylic acids can repair the interface after rupture and can enable the oil to regain connectivity in the reservoir. In addition, using a combination of different branched hydrocarbon compounds can elicit fluid-fluid behavior suggestive of improved connectivity and which results in improved recovery from the reservoir.

Methods described herein include various operations, which are performed either alone or in combination, such as destabilizing emulsions and re-establishing connectivity after it has been lost. Low concentrations of the organic acids, for example, less than 2 mM, such as about 1 mM, are utilized while providing for enhanced oil recovery. As a result, efficiency and economy of the oil recovery system can be increased.

The organic acids described herein can be directly dissolved at, e.g., a concentration of two (2) milliMolar (mM) or lower in injection water for waterflooding, or be delivered through encapsulation methods, such as dissolving the organic acids in oil-in-water emulsions at an oil fraction in water of 1-10 vol % at a concentration of organic acid of, e.g., up to about 200 mM in oil, resin dispersions extracted from the reservoir native crude oil at about the same vol % as oil-in-water emulsions at a concentration of organic acid of, e.g., up to about 200 mM in resin, and polymeric capsules at about the same vol % as oil-in-water emulsions at a concentration of organic acid in polymer capsules of, e.g., up to about 200 mM, among other possibilities. In certain embodiments, the organic acids can be injected during secondary or tertiary recovery operations. While not being bound by theory, it is believed that by implementing the embodiments described herein, an incremental recovery factor over traditional waterflooding is expected to be 5% or higher, depending on the oil, water, and/or rock system, but it is believed to function advantageously in both elastic and non-elastic reservoirs. Incremental recovery factor is the additional oil recovered in tertiary mode, e.g., after the effectiveness of traditional waterflooding ends.

Embodiments described herein include methods of enhanced oil recovery from reservoirs that contain, e.g., hydrocarbons. According to some embodiments, a method for enhanced oil recovery includes an operation of forming a mixture (e.g., by dissolving) of one or more organic acids (e.g., any acid described herein such as cyclopentane carboxylic acid, L-proline, cyclohexane carboxylic acid, 3-cyclohexane propionic acid, p-toluic acid, other naphthenic acids (e.g., those acids having the general formula $C_nH_{2n-z}O_2$ where n is the number of carbons and z is the unsaturation), or compounds with multiple carboxylic acid groups) in a water material (e.g., an injection water material) to form a treatment fluid. The concentration of organic acid in the treatment fluid may about 100 mM or less, such as about 10 mM or less, such as from about 0.1 mM to about 10 mM, such as from about 0.2 mM to about 2 mM, such as from about 0.5 mM to about 1 mM. The method can further include an operation of adding (e.g., injecting) the treatment fluid into a reservoir containing hydrocarbons. The method may further include withdrawing, removing, extracting, and/or producing hydrocarbons from the reservoir.

According to some embodiments, a method for enhanced oil recovery includes encapsulating one or more organic acids (e.g., any acid described herein such as cyclopentane carboxylic acid, L-proline, cyclohexane carboxylic acid, 3-cyclohexane propionic acid, p-toluic acid, other naphthenic acids (e.g., those acids having the general formula $C_nH_{2n-z}O_2$ where n is the number of carbons and z is the unsaturation), or compounds with multiple carboxylic acid groups) in one or more of an oil-in-water emulsion, a resin dispersion, or a polymer capsule to form a treatment fluid. Encapsulating the organic acid in an oil-in-water emulsion may be performed by using about 1 vol % of any oil in water. The oil may be an oil produced or separated from produced emulsions. The organic acid can be mixed (e.g., dissolved) in the oil to form a first mixture having the organic acids at a concentration of, e.g., about 10,000 mM or less in oil (such as about 1,000 mM or less, such as about 200 mM or less). The first mixture may be added to a volume of water to make 100 vol % to create the oil-in-injection water emulsions by using a shearing tool or ultrasonic dispersion tools.

Encapsulating the organic acid in a resin dispersion may be performed by taking resin extracted from produced oil or an alternative crude oil and dissolving the organic acids at a concentration of, e.g., about 10,000 mM or less in oil (such as about 1,000 mM or less, such as about 200 mM or less), and subsequently dispersing the acid-enriched resin in the injection water to a desired concentration. Resins can be large polymeric molecules that add to the viscosity of heavy oil, and crude oil can include resins. Resins can be extracted by wet-chemistry (e.g., by solvents) in a similar fashion to asphaltenes. Resins can aid in delivery methods as they can be soluble in the crude oil.

Encapsulating the organic acid in a polymer capsule may be performed by mixing (e.g., dissolving) organic acids in a polymer (such as a polyacrylamide, such as a 12-18 million Dalton polyacrylamide) along with a crosslinker (such as aluminum citrate) at, e.g., about 1:1 molar ratio of crosslinker to polymer. The polymer capsule may then be added to the injection water to form colloidal dispersions with the use of low-shear mixing tools.

The final concentration of organic acid in the treatment fluid may be about 100 mM or less, such as about 10 mM or less, such as from about 0.1 mM to about 10 mM, such as from about 0.2 mM to about 2 mM, such as from about 0.5 mM to about 1 mM. The method may further include injecting the treatment fluid into a reservoir containing hydrocarbons. The fluids may be injected by using a bypass valve from water injection system in the field to a holding tank while maintaining the temperature above about a freezing temperature, such as about 18° C. or higher. Injection pressure may be calculated to avoid fracture pressure at bottomhole conditions. The method may further include withdrawing, removing, extracting, and/or producing hydrocarbons from the reservoir.

According to some embodiments, a hydrocarbon recovery material may include one or more organic acids (e.g., any acid described herein such as cyclopentane carboxylic acid, L-proline, cyclohexane carboxylic acid, 3-cyclohexane propionic acid, p-toluic acid, other naphthenic acids (e.g., those acids having the general formula $C_nH_{2n-z}O_2$ where n is the number of carbons and z is the unsaturation), or compounds with multiple carboxylic acid groups) in a water material (e.g., an injection water material). The concentration of organic acid may be about 100 mM or less, such as about 10 mM or less, such as from about 0.1 mM to about 10 mM, such as from about 0.2 mM to about 2 mM, such as from about 0.5 mM to about 1 mM.

In some embodiments, heating (such as at a temperature of greater than about 18° C., such as from about 18° C. to about 40° C.) can be applied to dissolve the organic acid in the water material.

In some embodiments, the injection water material may have a salinity higher than the low-salinity limit of about 5,000 ppm of salinity, but lower than about 100,000 ppm, such as from about 10,000 ppm to about 50,000 ppm. In some embodiments, the injection water may have a salinity value below about 5,000 ppm. In some embodiments, the brine solution may be specially developed for the particular reservoir, which is called smart water. Smart water may have sulfate and/or other ions at an amount that is about 3-5 times higher concentration than seawater, and the typical salinity of seawater is about 40,000 ppm. Injection brines can be any composition of salts generally similar to the connate water but can also be some developed smart water, which results from the addition of determining ions, generally specific to reservoir conditions. The salinity and ions present may impact which acid(s) may be used, and at which concentrations. Reservoirs can employ some aspects of smart water flooding and addition of these acids could be considered an extension of this applied design.

In some embodiments, the injection water material may be seawater of typical salinity of from about 30,000 ppm to about 40,000 ppm, or soft water, such as water from fresh aquifer sources having from about 500 ppm to about 5000 ppm of salinity. In some embodiments, the concentration of barium and/or strontium in the water can be about 1 ppm or less. Other water material may be sulfate- or calcium-enriched seawater or briny material below about 100,000 ppm of salinity, depending on reservoir characteristics.

In some embodiments, the materials and methods described herein can be used in reservoirs (containing, e.g., hydrocarbons) having temperatures of from about 10° C. to about 250° C., such as from about 15° C. to about 150° C., such as from about 20° C. to about 120° C. This temperature enables the acids to remain soluble and decreases the likelihood of forming viscous phases in the aqueous phase. In some embodiments, the materials and methods described herein can be used in reservoirs (containing, e.g., hydrocarbons) having pressures of from about 0 psi to about 15,000 psi, such as from about 300 psi to about 10,000 psi.

Oil is comprised of four main solubility classes: saturates, aromatics, resins, and asphaltenes. Asphaltenes are polycyclic heteroatom containing compounds which are insoluble in pentane, hexane, and heptane but are soluble in toluene. Asphaltenes are polar and are therefore interfacially active (and can alter interfacial properties) and may cause refining problems, such as emulsion formation and precipitation. Asphaltenes are believed to contribute to the formation and build-up of the interface between oil and water. Interfacial viscoelasticity is believed to relate to asphaltene content. As the interface between oil and water builds over time, oils with higher concentrations of asphaltenes display increasingly higher viscous and elastic moduli. On the other hand, heavy oils are shown to take longer to form a stiff interface. While not being bound by theory, it is believed that the interface formation from heavy oils is caused, in part, because asphaltenes take longer to travel to the interface and form structures in such a viscous medium.

Typically, high fractions of asphaltenes are associated with poor oil recovery, as polar species can increase retention to the rock interface. Core-flooding experiments on oils containing no asphaltenes observe a drop in recovery, rather than an improvement in recovery, indicating the relative influence of asphaltenes in fluid-fluid interactions. In terms of stabilizing the interface, asphaltenes are believed to work inversely to the acids present in oil. As such, asphaltenes work to strengthen the interface and the acids work to weaken the interface. It is believed that naphthenic acids (e.g., compounds of the formula $C_nH_{2n-z}O_2$, such as cyclohexane carboxylic acids or cyclopentane carboxylic acids), and other organic acids (such as L-proline; and aromatic acids, for example p-toluic acid) can displace or interact with other components of the crude oil, or components of the oil/interface (such as asphaltenes), to make them less available to act at the interface.

In some embodiments, sodium naphthenates (e.g., sodium salts of the conjugate base of the naphthenic acids) and/or other organic acids having a counterion can be used. The sodium naphthenates and/or other organic acids having a counterion can compete with asphaltenes for adsorption and can hinder the development of a rigid interface. As both organic acids (e.g., naphthenic acids), and asphaltenes are polar and attracted to the oil-water interface, the interfacial rheology can be strongly dictated by the organic acid concentration (e.g., the naphthenic acid concentration), the asphaltene concentration, and the ratio of organic acid (e.g., naphthenic acid) to asphaltene in oil. The two species are theorized to be in competition for real estate at the interface, with size, viscosity, polarity, and concentration being variables which influence the interfacial rheology.

As described herein, it is believed that naphthenic acids can be used to adjust the oil-water interfacial viscoelasticity and oil-water interfacial tensions, and can improve oil recovery in corefloods. Naphthenic acids (NAs) and other organic acids are believed to contribute to softening of the interface, as an increase in emulsion coalescence is observed in the presence of a naphthenic acid and/or organic acid.

Experiments were performed to evaluate the chemical properties of the NAs and their behavior at the oil-water interface. Partitioning experiments were performed to track NA concentration in the aqueous phase after contact with the oil, and the pH was characterized to better understand the nature of the species partitioning from the oil phase. Rheological experiments were performed to assess the interfacial response of each NA structure (and each organic acid structure) compared to the low-salinity brine. The rheological results include the elastic modulus and viscous modulus of the bulk oil phase and the interface. Rheology is the study of flow and deformation and is usually classified by the deformation response to force, predominantly in liquids. Depending on the fluid, size and shape of the geometry, various modes of deformation may result. A fluid's response to different deformation types can provide a comprehensive perspective of how the interface structuralizes and functions, and ultimately, link fluid-fluid interactions with improved oil recovery.

EXAMPLES

Materials

The following carboxylic acids were acquired from Sigma Aldrich (St. Louis, Mo.) and the acids utilized in the embodiments described below were selected from the following: Dicyclohexyl acetic acid, cyclohexane pentanoic acid, 4-pentylbenzoic acid, 1-methyl-1-cyclohexane carboxylic acid, 5,8 cholanic acid, 2-hexyldecanoic acid, 4-phenylbutyric acid, cyclohexane acetic acid, 3-cyclohexane acetic acid, 3-cyclohexane propionic acid, 4-heptyl benzoic acid, p-toluic acid, decanoic acid, cyclopentane carboxylic acid, (±)-4-methyl octanoic acid, cyclohexane butyric acid, biphenyl-4-carboxylic acid, cyclohexane carboxylic acid. L-proline and a naphthenic acid mixture containing various unspecified C12-C14 cyclic acids were acquired Sigma Aldrich, and are used herein to compare the results collected with a mixture shown to improve oil recovery. Sodium sulfate ($Na_2SO_4$) was also procured from Sigma Aldrich; brine containing sodium sulfate was selected as a comparative. In some embodiments, the brine (or the low-salinity brine) can be aqueous sodium sulfate (1% $Na_2SO_4$).

The oils analyzed in the embodiments described below were obtained from sandy reservoirs in the state of Wyoming. Toluene and methanol were utilized as cleaning fluids where oil and oily organics were used. Whatman ashless filters, PFGSE filters, and SFCA filters were purchased from Sigma Aldrich, Fisher Scientific (Hampton, N.H.), and Celltreat (Pepperell, Mass.), respectively.

Sample Preparation

The crude oil used for the experiments herein, unless otherwise noted, is labeled as GB oil. The GB oil was centrifuged for about four hours and filtered with, e.g., a 90 mm Whatman ashless filter under nitrogen gas pressure before use. The oil was stored in an amber jar to protect it from UV decomposition and shaken thoroughly before each use.

A 1% $Na_2SO_4$ brine, equivalent to 2.24 mM (low salinity) and an ionic strength of 6.7 mM, was prepared and vacuumed for two hours before use. The brine was selected because it served as the baseline aqueous phase for the coreflooding experiments. Brine aliquots were then mixed with each of the 18 acid solutions at various concentrations and mixed into solution for several days. One acid, NA18, was especially soluble at higher concentrations and measurements were also performed at 2.5 mM, 5 mM, and 10 mM for NA18. Several acids exhibited poor solubility despite various mixing times, heat applied, or the concentration attempted. No adjustments were made to the brine to bring the acids into solution; at higher brine pH, larger naphthenic acids (NAs) solubilize more readily, while smaller ones can often dissolve at neutral pH. At higher pH, the potential for micelle and reverse micelle formation increases. However, embodiments described herein relate to acids that partition naturally, rather than those coaxed from the oil phase, so pH adjustments were not made in order to examine the influence of the acids in the system.

Of the 18 individual acids assessed, six were found to be insoluble in the brine, while the others were compared for structural similarities and peak quality. In summary, four carboxylic acids (including naphthenic acids) were analyzed according to water solubility and structural diversity: cyclopentane carboxylic acid (NA14), cyclohexane carboxylic acid (NA18), 3-cyclohexane propionic acid (NA10), and p-toluic acid (NA12). The structures include a cyclopentane, a cyclohexane, a cyclohexane with a chain, and an aromatic ring. L-proline, while not a naphthenic acid, was also analyzed due to its similarity in structure to NA14.

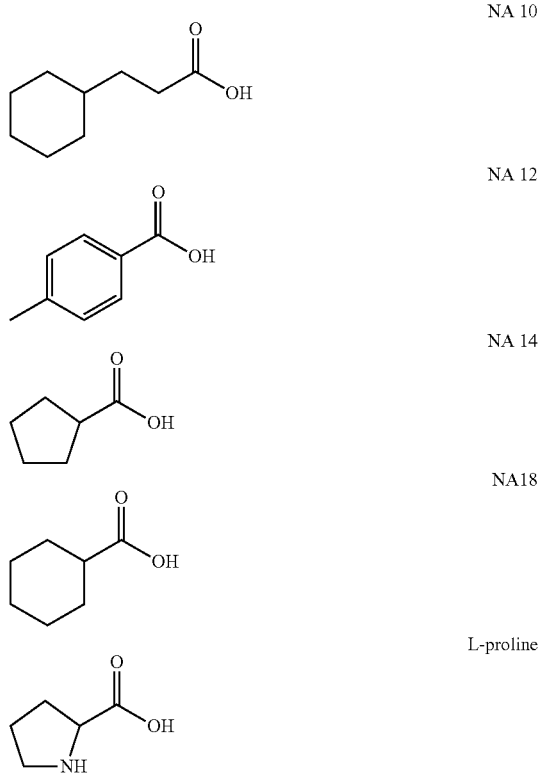

NA 10

NA 12

NA 14

NA18

L-proline

Additionally, the naphthenic acid mixture (NAmix1) was analyzed. The NAmix1 solution was mixed at 1 wt % in the 1% $Na_2SO_4$ brine. The NAmix1 is partially soluble in water at 25° C. and the undissolved oily film is removed and discarded prior to investigation.

Density and pH measurements were derived for each acid solution on a DMA 4500 Anton Paar Density meter (Ashland, Va.) and VWR Symphony SB70P pH meter (Radnor, Pa.). $^1$H NMR experiments were performed at 25° C. using a Bruker Avance III 600 instrument. Chemical shifts were referenced to water as the internal standard. For each example acid, the spectral width was measured at 12 ppm and 256 scans were captured. The pulse sequence used applied an excitation sculpting solvent suppression for 1D $^1$H NMR, which works with samples in 90% $H_2O$ and 10% $D_2O$. The instrument was allowed to select its own gain, which is often concentration dependent. A time domain of 32,000 points was selected. In general, to process acid concentrations, the area of a control peak is taken to be 1 and the area from 0-3 ppm is taken for every sample. Subsequently this area is normalized over the gain.

FIG. 1 illustrates $^1$H NMR data for various example acids. In FIG. 1, individual structures are provided in addition to the fingerprint for the numerous species present in the NAmix1 at 25° C. In NAmix1, which was shown to increase oil recovery, no water-soluble aromatic compounds are seen in the NMR data.

Figure 5:
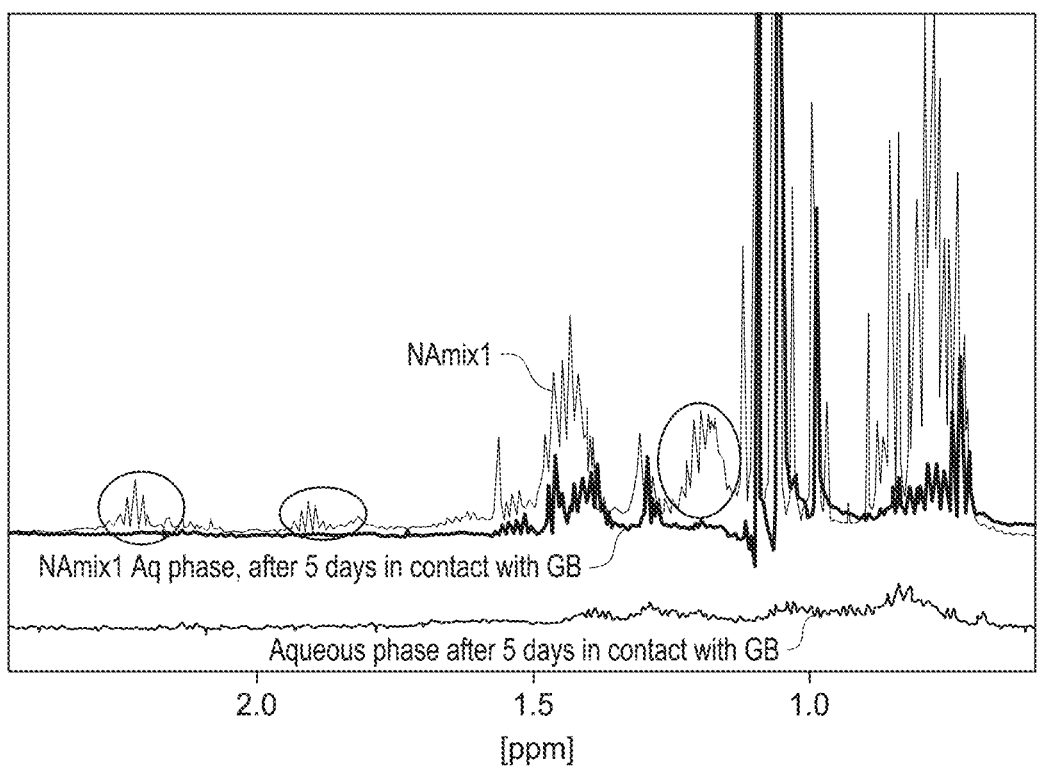
FIG. 5 shows NMR data for NAmix1 according to some embodiments.

With reference to the NAmix1 in contact with the GB oil, the data showed that no aromatic compounds partition into the aqueous phase, with or without acids in the initial aqueous phase as seen in FIG. 5 (discussed further below). Despite the lack of aromatics seen in the NMR data of NAmix1, NA12 was selected to further characterize the interfacial effects elicited by cyclohexanes and to explore aromatics as interfacially active species.

Crude Oil Characterization

Table 1 shows characteristics of various crude oils—labeled as TC, WB, and GB. The asphaltene content ($C_5$ wt %) of these crude oils was determined by stirring an aliquot of oil (1 g of oil) in 40 g of analytical grade n-pentane to form a 1:40 by weight solution of oil to n-pentane. Asphaltenes are the portion of oil insoluble in short-chain alkanes; as such they collect on the filter when filtered under vacuum. The solution was allowed to stir at about ambient conditions for about a full day. The solution was then vacuum filtered through a 0.45 μm PFGSE filter paper and rinsed with pentane until the solution rinsed clear to prevent asphaltene deposition to the glass. The solution was maintained under vacuum until small cracks appeared on the asphaltene fraction remaining on the filter. The asphaltene precipitate and filtrate were dried in an oven until the weight stopped changing, indicating that no more solvent was evaporating, and the asphaltene precipitate remained substantially free of other constituents. The asphaltene fraction was determined by the weight of the precipitate as compared to the original aliquot of oil in the solution.

The crude oil viscosity was determined using a parallel plate geometry on an ARES rheometer from TA instruments (New Castle, Del.). The strain was held steady for a frequency sweep on a range of 1-200 Hz with a gap of 0.3 mm. Ten measurements were made per decade to provide the results in Table 1. The acid content was determined through $^1$H NMR on the aqueous phase extracted from various partitioning experiments. Density was determined through with an Anton-Paar density meter and was collected a minimum of five times to collect an average. Refractive index was determined by using a refractometer and was collected a minimum of five times to collect an average.

TABLE 1

| Oil | Acid Content (N Area) | Asphaltene Content ($C_5$ wt %) | Viscosity (cP) | Density (g/mL) | Refractive Index |
|---|---|---|---|---|---|
| TC | 5.6817 | 5.5 | 64 | 0.91 | 1.515 |
| WG | 1.2652 | 10.5 | 105 | 0.92 | 1.527 |
| GB | 1.3013 | 9.7 | 90 | 0.91 | 1.5205 |

The calculation for normalized area of NMR plots uses a quantifying technique. The procedure allows determination of a relative concentration of a compound in solution compared to other standards collected under the same conditions. Here, the fingerprint acid areas, normalized over the receiver gain, are compared to estimate the difference in acid quantity yielded by each oil. The refractive index is similar for all three oils (GB, WG, and TC) despite the difference in asphaltene content among them. The refractive index similarity indicates that the asphaltenes present in the TC oil are different and likely more polar than the asphaltenes present in the WG and GB oils. The GB oil was used for the following experiments.

Interfacial Characterization

Rheological experiments were conducted with the GB oil and a low-salinity brine (1% $Na_2SO_4$) spiked with low concentration of organic acids using a TA Instruments AR-G2 Rheometer with a double-wall ring geometry. Measurement of the oil-water interface was performed using the rheometer, as the ring of the rheometer was placed directly on the denser phase, with the second phase added carefully at the end. The shear viscoelasticities were recorded at 25° C. Measurements were run in oscillatory time-sweep mode to measure the shear viscoelastic moduli, as the oscillatory time-sweep mode has high sensitivity to measure low frequency and torque values.

The stress response of the oil-water interface can be calculated utilizing Equation 1:

$$\sigma(t) = \gamma_o [G'(\omega)\sin(\omega t) + G''(\omega)\cos(\omega t)]$$

where $\sigma$ represents the shear stress, t represents the time, $\gamma_o$ is the amplitude of the strain, $G'(\omega)$ is the elastic or real modulus, and $G''(\omega)$ is the viscous or imaginary modulus. The elastic modulus is the instantaneous response to stress and the viscous modulus is the delayed response quantified by a phase angle. The tangent of this angle is represented by the following equation:

$$\tan(\delta) = \frac{G''}{G'}$$

Experiments were run in the linear viscoelastic region, determined with a strain sweep test at fixed frequency on individual samples to determine appropriate values for each parameter in the following experiments.

The rheometer was cleaned with toluene and methanol and then air-dried; the Pt/Ir ring of the rheometer was flamed to remove residual contaminants and salts before each experiment. The rheometer was positioned on an air-table and was calibrated for geometry, inertia, and friction before each experiment was prepared. The brine was filtered through a 0.45 μm SFCA filter and examined for bubbles before the ring was lowered to sit at the interface. Next, the oil was added on top of the brine in a manner selected to avoid disruption of the interface formed. Without moving the table, the setup was covered and allowed to run for a minimum of five days. The viscoelasticity was measured several times during the first day and then routinely once a day for the remainder of the experiment duration. The temperature was controlled with the Peltier plate beneath the sample holder. When cleaning the rheometer at the end of the experiment, care was taken to recover as much aqueous phase as possible for NMR and pH measurements.

The interfacial viscoelasticity measurements were conducted on samples having a ratio of two parts aqueous phase to one part oil phase. An aqueous phase was collected with only the brine solution, and then the acids selected were all measured at a concentration of 1 mM in that brine. NA18 was especially water soluble and thus higher concentrations were measured, including 2.5 mM, 5 mM, and 10 mM. Results show that increasing the concentration from 1 mM NA18 to 2.5 mM NA18 decreases the viscoelastic moduli, however this change plateaus and similar results are collected for 2.5 mM, 5 mM, and 10 mM, which may suggest that the acids are aggregating in the water phase and the increase in concentration may not, in fact, increase the amount of acid acting at the interface. These results are supported by the NMR results (i.e. the concentration increases between 1 and 2.5 mM, but results agree regarding aggregation above this concentration).

Figure 2A:
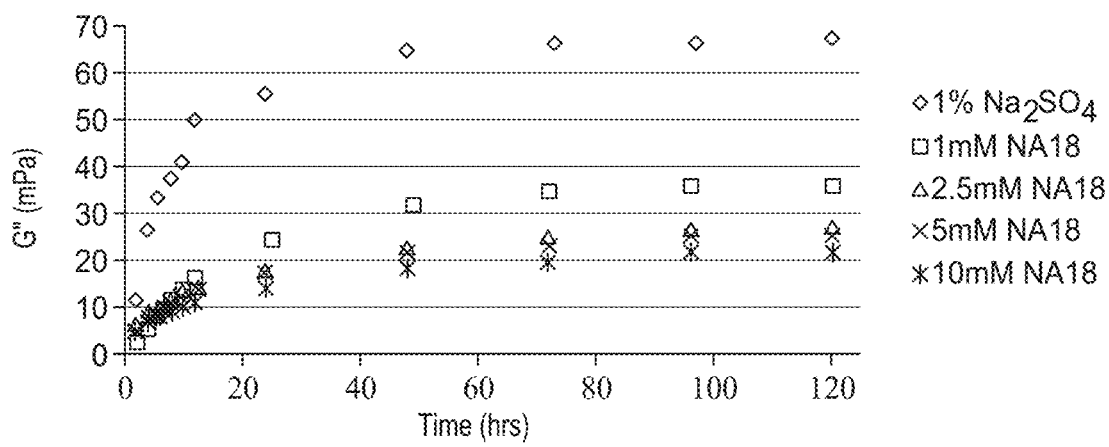
FIG. 2A is concentration sweep data for example acids according to some embodiments.
Figure 2B:
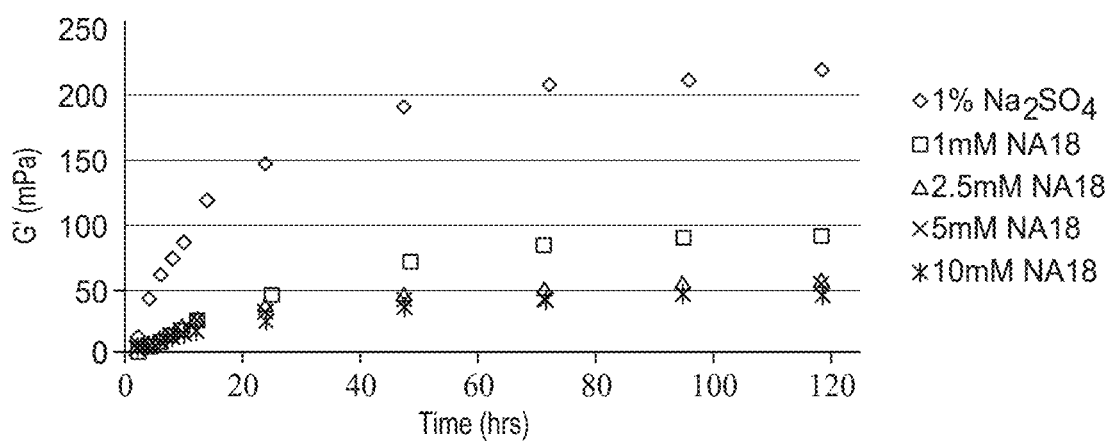
FIG. 2B is concentration sweep data for example acids according to some embodiments.
Figure 2C:
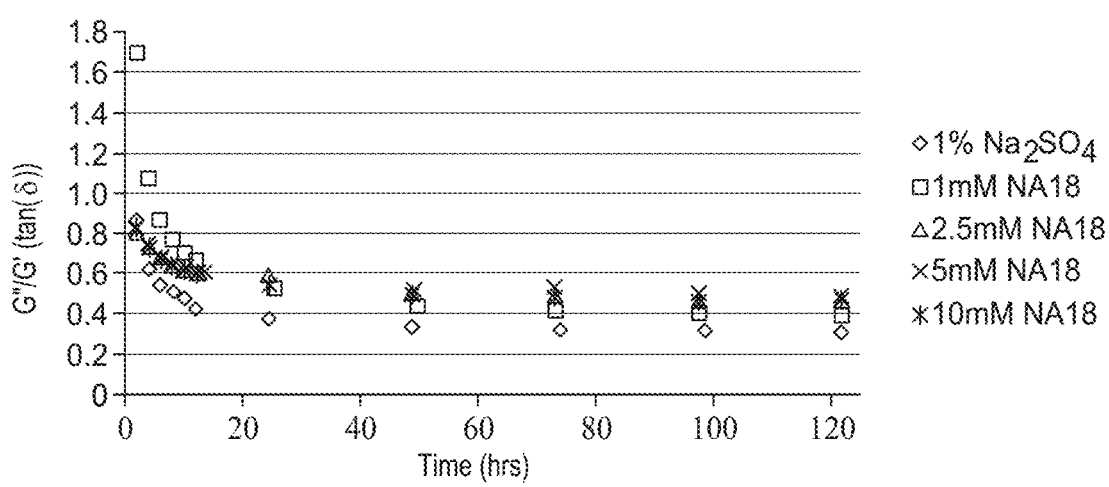
FIG. 2C is concentration sweep data for example acids according to some embodiments.

FIGS. 2A-2C show rheology data for NA18—the most soluble acid of those tested, as described above—at various concentrations according to some embodiments. The data illustrates that although the G' modulus and G" modulus decrease with time, the ratio ($\tan(\delta)$) increases with an increasingly acidified brine. The $\tan(\delta)$ value is related to the ability of a material to damp and the degree of structure within the fluid interface. The values for $\tan(\delta)$ show that there is more structuring as the concentration increases, which is believed to be evidence in support of the acid aggregating with itself in the aqueous phase.

FIGS. 2A-2C show that the interfacial viscoelasticity can be nearly halved using a 1 mM acid concentration, and the interfacial viscoelasticity continues to decrease with increasing acid concentration. At day 5, the G" value (viscous modulus) for the 1% $Na_2SO_4$ in oil is about 65 mPa, the 1 mM NA18 acid in oil is about 35 mPa, the G' value (elastic modulus) for the 1% $Na_2SO_4$ in the oil is about 225 mPa, and the 1 mM NA18 acid in the oil is about 100 mPa. At day 5, the 10 mM NA18 acid in oil example reached an interface that was 21.2% of the un-acidified brine values.

The data shows that higher acid concentrations can continue to decrease the viscoelasticity of the interface even with a mid-weight oil containing about 9.7% asphaltenes. The data also shows that a dramatic change in viscoelasticity is also observed at concentrations as low as 1 mM. The 5 mM and the 10 mM values correlate very closely with both the interfacial rheology and the NMR data (Table 2; NMR data not shown). Accordingly, once a surfactant has reached its critical micelle concentration (CMC), the amount of individual molecules adhering to the interface does not increase, and the interfacial measurements plateau which is indicative of acid aggregation. However aggregates can still form structures with the interface.

Considering the experimental data collectively, the NMR and viscoelasticity data suggest the formation of aggregates in the solution at higher concentrations. The NMR signal can be analyzed such that a different trend can arise in the presence of aggregates than single molecules. Additionally, aggregates can interact with the interface differently than single molecules, as demonstrated with minimal change in viscoelasticity values at higher concentration. As the other acids included in this study are considered to be less soluble than NA18, an acid concentration of 1 mM is used to compare the remainder of the solutions.

Figure 3A:
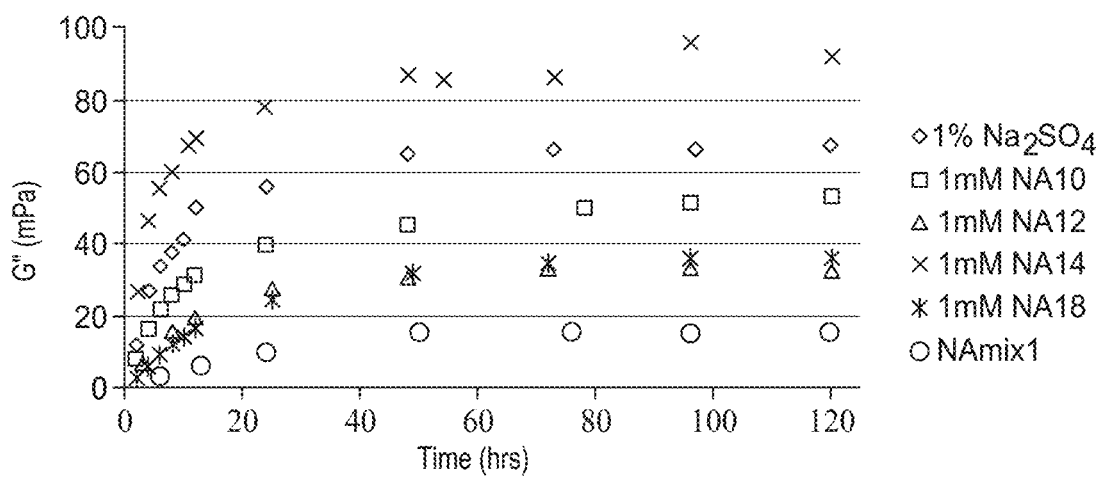
FIG. 3A is rheology data (viscous modulus versus time) for example acids analyzed at a concentration of 1 milli-Molar (mM) according to some embodiments.
Figure 3B:
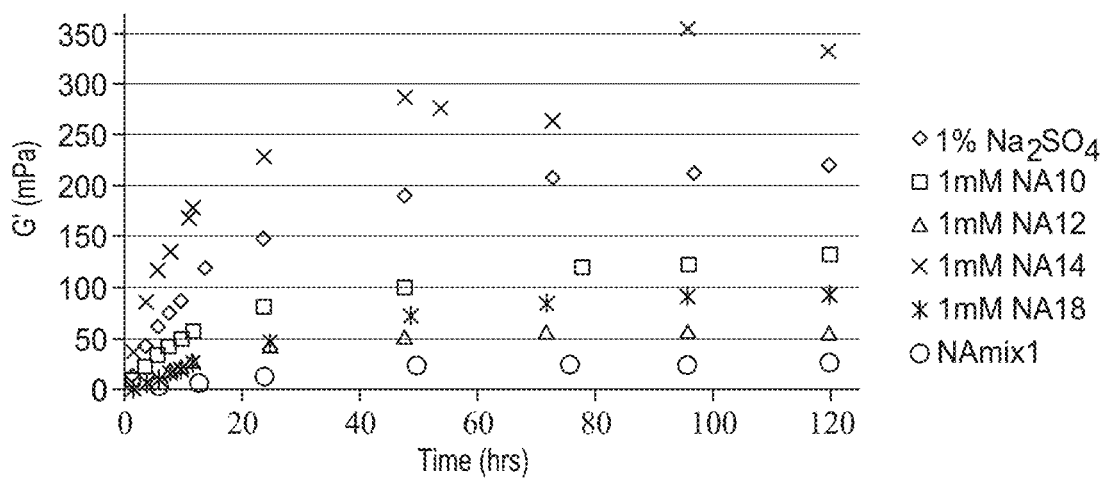
FIG. 3B is rheology data (elastic modulus versus time) for example acids analyzed at a concentration of 1 mM according to some embodiments.
Figure 3C:
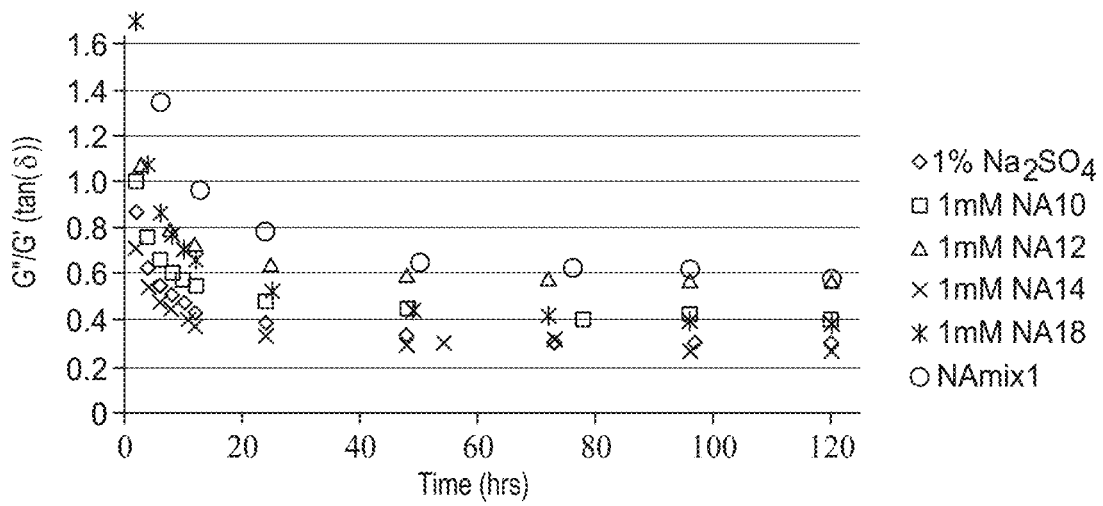
FIG. 3C is rheology data (tan($\delta$) versus time) for example acids analyzed at a concentration of 1 mM according to some embodiments.

FIGS. 3A-3C show rheometric data for the example acids at a concentration of 1 mM. The data shows that the cyclohexanes all decrease the viscoelasticity of the interface. Acids NA18 and NA12, the two smallest 6-membered rings examined, exhibit very similar viscoelasticity trends. NA10, which is also a cyclohexane but with a longer carbon chain between the carboxylic acid and the cyclohexane, has viscoelasticity values that lie between the NA18 and NA12 and the un-acidified brine. It is believed that the smaller molecules interact more strongly with the interface while the larger NA10 provides intermediate viscoelastic results, which is indicative of emulsion destabilization, thus supporting the theory that there is more to fluid-fluid interactions than just viscoelasticity.

A surprising difference is noticed when NA14 is tested, as the cyclopentane dramatically increases the individual viscous modulus and elastic modulus. The interface reaches such high elasticity values that it seems to break, but then continues to increase in elasticity as if it were repaired. A broken interface can show viscoelasticity values which continue to decrease with time. This unexpected behavior provoked the investigation into the amino acid L-proline, which has a similar structure to NA14 but this amino acid replaces a ring carbon atom with nitrogen atom.

Figure 4A:
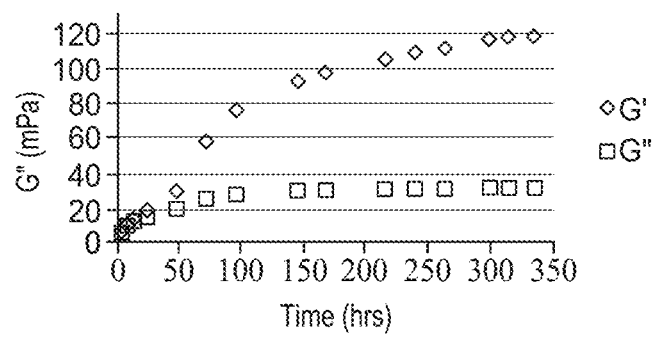
FIG. 4A is rheology data (viscosity and elastic moduli versus time) for an example acid according to some embodiments.
Figure 4B:
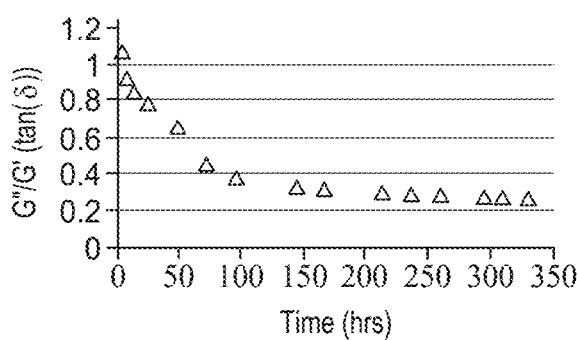
FIG. 4B is the tangent of the phase angle versus time (tan($\delta$)) for an example acid according to an embodiment.

FIGS. 4A and 4B show the interfacial rheology data for L-proline. L-proline exhibits initially low values of both the G' modulus and the G" modulus, but after day 2, the values spike and continue at an increased rate for another week before plateauing. The results in this experiment, and in the NA14 case, indicate that cyclopentane structures may work to mend the interface if that interface is disrupted.

The plots of tan(δ) for the example organic acids are given in FIGS. 3C and 4B. The NAmix1 softens the interface that results in a weaker interface. Although having a different chemical structure, the NA12 acid displays very similar values for the interfacial dampening, but the NA12 acid is aromatic and typically not observed in the aqueous phase, which does not imply that it is not present in the oil phase. The aromatic species also showed tighter interfacial packing than saturated systems. While not being bound by theory, it is believed that the aromatic structure of NA12 fits closely with the asphaltenes collecting at the interface from the oil side. The NA10 acid and the NA18 acid show similar interfacial softening behavior, as do the NA14 acid and the 1% $Na_2SO_4$ brines.

In this instance, acids that decrease the viscoelastic moduli are shown to increase interfacial dampening/softening/tan(δ), while the tan(δ) of NA14 is well-overlapped with the unadjusted brine values, despite the aforementioned increase in individual moduli. This indicates that NA14 can be used to adjust the interfacial response. Table 2 illustrates the effects of each acid on the interfacial viscoelastic moduli compared to the brine viscoelastic moduli. It is believed that the adsorption of naphthenic acids generally softens or destabilizes the interface, which can be seen in the tan(δ) values. These effects typically promote coalescence, which can be assessed with the emulsion stability data described herein.

TABLE 2

| Acid Solution | Fractional G' | Fractional G" | tan(δ) |
|---|---|---|---|
| 1 mM NA10 | 60% | 78.9% | 131% |
| 1 mM NA12 | 25.8% | 48.8% | 189% |
| 1 mM NA14 | 151% | 137% | 90.6% |
| 1 mM NA18 | 42% | 53.5% | 127% |
| 1 mM L-Proline | 53% | 47% | 114% |
| 1 wt % NAmix1 | 12% | 23% | 188% |

$^1$H NMR was also used to track changes in concentration of NA fractions from partitioning experiments. Partitioning experiments were performed to acquire NMR data for the aqueous phases of various acids in contact with the GB oil. Samples of the various organic acids (in brine) in contact with the GB oil were made having an oil-brine volumetric ratio of about 45:1. Each brine was placed in a glass jar and GB oil was then carefully placed on top of the brine. The jars were sealed with a screw-lid and placed in ovens at about 25° C. and left for a total of about 5 days. The samples were collected from each jar and pH measurements were taken after 0.5, 1, 3, and 5 days. Care was taken to minimize temperature changes and mixing of the phases. The pH probe was carefully calibrated at about 25° C. before each set of measurements were collected. After the predefined period of time was completed, a sample of 630 μL was taken and placed in a 9" NMR sample tube with 70 μL $D_2O$. A 600 MHz Bruker Avance III instrument was used to collect NMR spectra at 25° C., using a spectral width of 12 ppm and 256 scans and an excitation sculpting solvent suppression. The control of the spectral gain was given to the instrument for the entire experimental matrix as this is largely concentration dependent. The spectra were analyzed to compare organic acid concentration in the brine phase over time at different temperatures.

The partitioning experiments were conducted on the GB oil with the NAmix1 in the low-salinity $Na_2SO_4$ brine (2 parts aqueous phase to 1 part oil, volume ratio) over the course of 5 days to observe the motion of the myriad acids starting out in the aqueous phase. FIG. 5 illustrates the difference between the initial acid species and the final acid species for NAmix1 and 1% $Na_2SO_4$ in the oil. More specifically, FIG. 5 shows $^1$H NMR data for the NAmix1 before contact with the GB oil, NAmix1 after a 5-day contact time with the GB oil, and 1% $Na_2SO_4$ after a 5-day contact time with the GB oil. The 1 wt % mixture (e.g., NAmix1) has an initial acid content that is not only more diverse, but also at a higher initial concentration than the other acids examined (1-10 mM).

The bottom spectrum of FIG. 5 shows the acids of NAmix1 which partition from the GB oil into the 1% $Na_2SO_4$ after 5 days of contact. The NAmix1 data shows that the initial NAmix1 spectrum is complex, as there are several species present with 12-14 carbons each. The difference in spectra between the initial NAmix1 before contact with the GB oil and the NAmix1 after a 5-day contact with GB oil is clearly observed by the loss of several peaks, some of which are circled in FIG. 5. This loss of some signals indicates that some species are either forming new bonds or leaving the aqueous phase. Acids initially present in the aqueous phase can leave the aqueous phase to either partition to the oil phase or sit at and work to build up the interfacial film between oil and water. The formation of new species is not ruled out; however, there are few new peaks observed which would support that outcome.

Emulsion Stability Analysis

Dispersions were prepared in a 1:1 volume ratio with GB oil to each acid (1 mM) in the 1% $Na_2SO_4$ brine. The dispersions were emulsified via centrifugation at 6500 rpm for 30 seconds in an Ultra Turrax T25 basic (IKA-Werke) homogenizer. The emulsions were then homogenized for 3 minutes at 6500 rpm to obtain homogeneous droplets for characterization.

Water-in-oil emulsions were prepared for each acid and the time evolution was tracked on a Bruker Biospin Minispec mq20 time domain nuclear magnetic resonance (TD-NMR). This instrument provides information about the polydispersity (σ) of the system and the diameter size ($d_i$). The variable i can represent either the diameter in terms of the number of droplets (i=0) or the diameter in terms of average volume of the droplets (i=3). The unimodal droplet size distribution for the created emulsions can be calculated according to Equation 2:

$$q_i(d) = \frac{1}{d\sigma\sqrt{2\pi}} e^{-\frac{(ln(d)-ln(d_{50,i}))^2}{2\sigma^2}}$$

where $q_i$ is the log-normal distribution, $d_{50,i}$ is the geometric mean diameter. Bruker software is used for the NMR and that calculated the droplet size distribution. The change in diameter in relation to the volume is useful because it is indicative of coalescence. The polydispersity is also useful in terms of stability, as a system which shows a change over time may be considered not stable.

This technique is advantageous as it is non-invasive and independent of the opacity of the dispersion. A unimodal log-normal function was used as it has been shown to be a suitable density function to measure droplet-size distribution on water-in-oil (W/O) or oil-in-water (O/W) emulsions. Droplet coalescence and emulsion stability was inferred by tracking the droplet-size distribution density over time.

Breakup and snap-off are shown to be the competing processes regarding a connected oil phase in which the dominant process is dictated by oil saturation. The influence of the specific acids on coalescence was evaluated with restricted diffusion in a time-domain nuclear magnetic resonance (TD-NMR) system. Water-in-oil emulsions were prepared for 1% $Na_2SO_4$, 1 wt % NAmix1, and each acid at 1 mM concentration. Measurements were recorded within the first hour after emulsification, and every day for days 1-5, and then on days 7, 10, and 14. The TD-NMR system calculates a median diameter, which relates to the number of droplets present ($d_0$) and the volume of the droplets present ($d_3$). The $d_0$ can be consistently lower than the $d_3$, since small droplets, though higher in number, contribute less to the overall volume of emulsion droplets. Conversely, droplets with larger diameters contribute to the greater part of the volume, but do not exist in large quantities. The Bruker system software also provides a standard deviation, $\sigma$, which is applicable for both diameter values and relates to the polydispersity of the droplets in solution. A combination of this a value with either diameter value in Equation 2 allows for a calculation of the density distribution functions for the acids, as seen in FIGS. 6A and 6B.

Figure 6A:
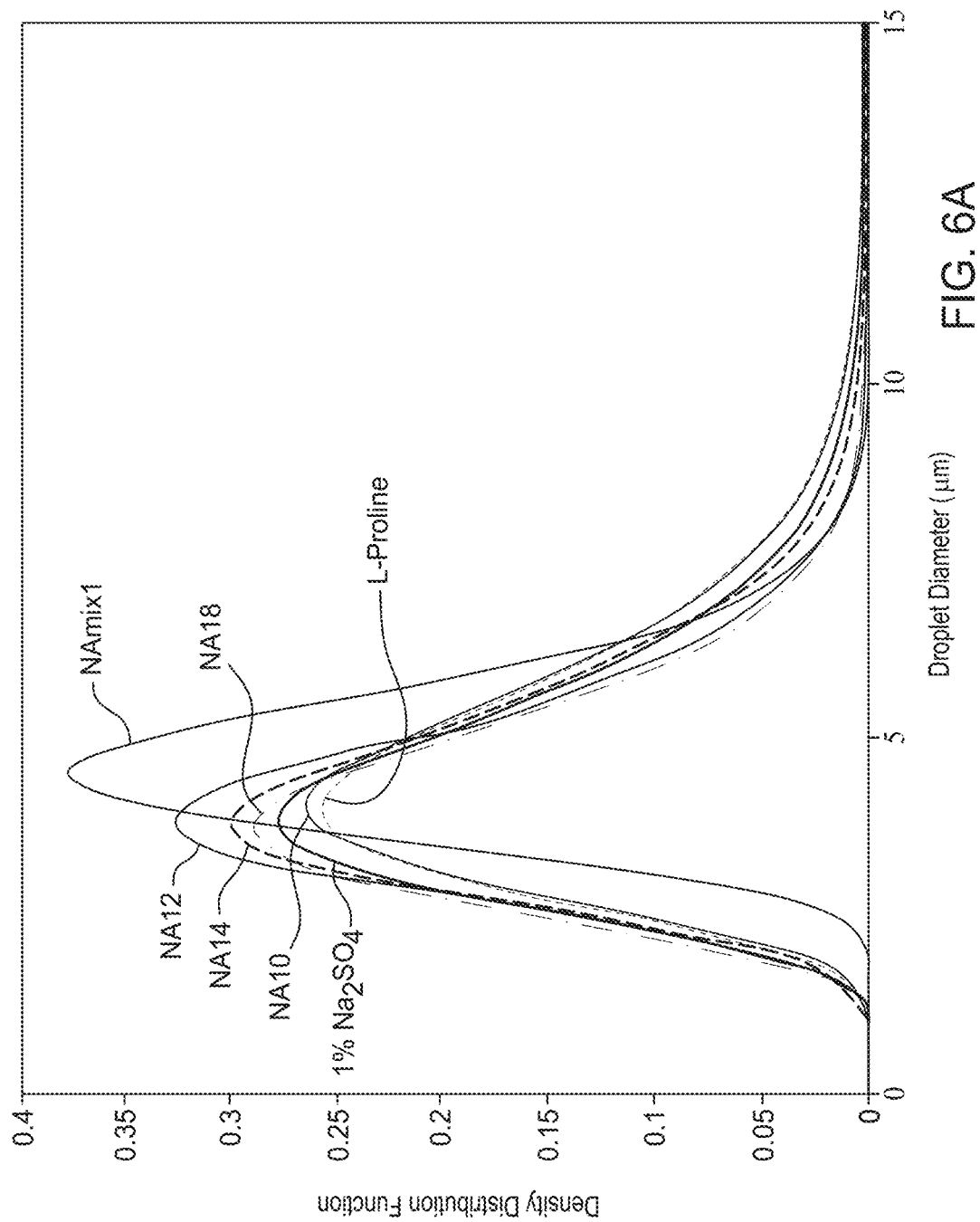
FIG. 6A shows density distribution functions for example acids at 1 mM concentration on day 1 according to some embodiments.

FIGS. 6A and 6B show the density distribution functions of example acids at 1 mM concentration on day 1 and day 14 according to an embodiment. The NAmix1 elicits the most monodisperse emulsions on day 1, compared to 1% $Na_2SO_4$ and the other acids. NA12, NA14, and NA18 also show greater monodispersity on day 1 than does the brine alone. However, NA10 and L-proline are more polydisperse. This indicates that the shearing forms emulsions differently based on the organic acid present. On day 14 the order changes, and L-proline is the most monodisperse emulsion solution, followed closely by NA14 and NA18. L-proline, NA14, and NA18 are believed to qualitatively stabilize emulsions compared to the low-salinity brine (1% $Na_2SO_4$). NA10, NA12, and NAmix1 all increase the polydispersity more so than does 1% $Na_2SO_4$, which is believed to indicate a destabilization of the emulsion system. The stability of emulsions decreases over time, evidenced by the increase in polydispersity and diameters of all emulsion systems.

Analyzing the changes on a per acid basis elucidates the individual behavior. FIGS. 7A-7G illustrate an overlay of each acid on day 1 compared to day 5 and day 14. The clear shift to increasing diameter and increase in polydispersity which occurs over time is visible. NAmix1 (FIG. 7B) and NA10 (FIG. 7C) stand apart when compared to acids which do not cause such a dramatic shift, such as L-proline (FIG. 7G). L-proline has the lowest curve on day 1 and changes the least; L-proline reaches equilibrium faster than the others, as indicated by the similarity in the curves for day 5 and 14. While NA10 also has a low curve on day 1, NA10 shows a more dramatic widening, correlating with a greater increase in polydispersity.

Table 3 shows the differences in these values for two time fragments: $\Delta x$ for days 1-5 and $\Delta x$ for days 1-14, where x represents either $d_3$ or $\sigma$. The $d_0$, or number median diameter, is omitted as it relates very closely to the $\sigma$ value, as increasing polydispersity likely increases the number of small droplets. The comparisons show that the rate at which acids stabilize or destabilize the emulsions is time-dependent. All stabilization or destabilization comparisons in Table 3 are made with 1% $Na_2SO_4$ as the control.

TABLE 3

Time Influence on Emulsion Destabilization by Acids

| Acid Solution | $\Delta d_3$ day 5 | $\Delta \sigma$ day 5 | $\Delta d_3$ day 14 | $\Delta \sigma$ day 14 |
|---|---|---|---|---|
| 1% $Na_2SO_4$ | 1.4705 | 0.162 | 1.641 | 0.273 |
| 1 wt % NAmix1 | 1.352 | 0.286 | 1.705 | 0.375 |
| 1 mM NA10 | 1.46 | 0.2345 | 1.65 | 0.3755 |
| 1 mM NA12 | 1.315 | 0.19975 | 1.6025 | 0.34625 |
| 1 mM NA14 | 1.3475 | 1.3475 | 1.4425 | 0.259 |
| 1 mM L-Proline | 1.045 | 0.1325 | 1.115 | 0.17225 |
| 1 mM NA18 | 1.5395 | 0.12625 | 1.572 | 0.22375 |

The change in volume ($\Delta d_3$), based on the acid, from day 1 to day 5 and from day 1 to day 14 has the following ranking:

day 5: NA18>$Na_2SO_4$>NA10>NAmix1>NA14>NA12>L-proline day 14: NAmix1>NA10>$Na_2SO_4$>NA12>NA18>NA14>L-proline This change in ranking from day 5 to day 14 shows that the acids not only act differently based on structure, but the effect is time-dependent. NAmix1 destabilizes emulsions the most, while L-proline allows the most stabilization of emulsions. In this sense, the long-term stability behavior resolves as shown above.

FIG. 7 illustrates a density distribution function as a function of droplet diameter for the various acids. Polydispersity is utilized to induce capillary motion, as there will be substantially no change in pressure in a monodisperse system, which would remain capillary trapped, provided the oil ganglia are larger than the adjacent pore throats, but small enough to not overcome capillary barriers through viscous drag. On day 14 it was observed that L-proline, NA14, and NA18 act to stabilize the emulsions compared to the behavior shown by the 1% $Na_2SO_4$ emulsion solution: these acids show minimal change in diameter and polydispersity compared to the brine emulsions.

NA10 and NAmix1 show a larger increase in the $d_3$ compared to the brine and a greater increase in polydispersity, indicating that these acids decrease the stability of the emulsions. NA10 consistently demonstrates the highest $\sigma$ values, indicative of highly polydisperse emulsions, as shown by the shorter and wider dispersion graphs than the other emulsion solutions in FIGS. 7A-7G. On day 14, NA12 has a greater polydispersity than the brine alone, but does not show an increase in diameter to the same extent, indicating that NA12 does not encourage coalescence, but does not particularly stabilize the emulsions present. These results indicate the generalization "naphthenic acids stabilize emulsions" can be more accurate for a time period of less than a week, but by two weeks a napthenic acid's ability to stabilize emulsions can be species-dependent.

Neck Diameter

Cyclopentane carboxylic acid (NA14), cyclohexane carboxylic acid (NA18), 3-cyclohexane propionic acid (NA10), and the low-salinity brine (1% $Na_2SO_4$) were used to make example acidified brine in oil systems for the neck diameter experiments. The systems used for the neck diameter experiments include about a 1:10 ratio of the GB oil phase to aqueous phase (1 mM of NA10 in 1% $Na_2SO_4$, 1 mM of NA14 in 1% $Na_2SO_4$, 1 mM of NA18 in 1% $Na_2SO_4$, and 1% $Na_2SO_4$). The oil is ejected from one needle tip and then attached to another needle and stretched between the two. The brine is gently added and the system is aged before oil is withdrawn from the suspended bridge. The more oil that is removed before the bridge snaps can be indicative of a system that delays snap-off and allows more oil to stay mobilized in porous media.

Figure 8A:
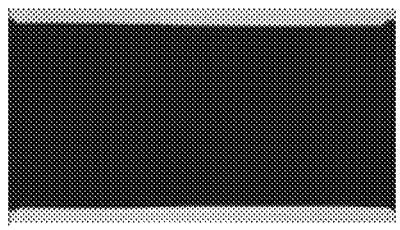
FIG. 8A is an image of a bridge before aging or oil removal according to some embodiments.
Figure 8B:
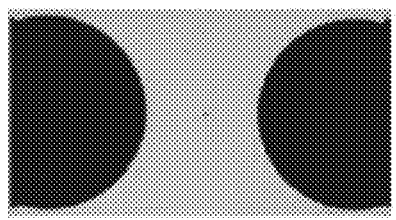
FIG. 8B is an image observed in an inelastic break of a bridge according to some embodiments.
Figure 8C:
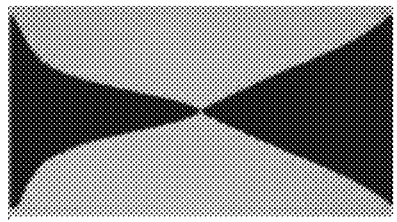
FIG. 8C is an image observed in an elastic break of a bridge according to some embodiments.
Figure 9D:
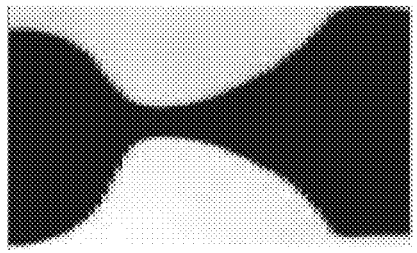
FIG. 9D is an unaged bridge image of an example acidified brine in oil system according to some embodiments.
Figure 9C:
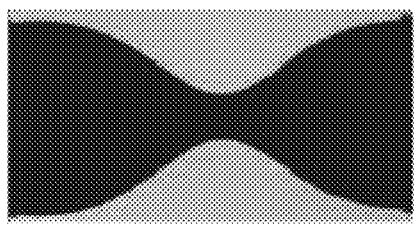
FIG. 9C is an unaged bridge image of an example acidified brine in oil system according to some embodiments.
Figure 9B:
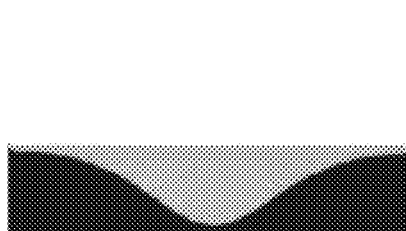
FIG. 9B is an unaged bridge image of an example acidified brine in oil system according to some embodiments.
Figure 9A:
FIG. 9A is an unaged bridge image of the 1% $Na_2SO_4$ in oil system according to some embodiments.

A bridge technique was executed on a modified First Ten Angstroms (FTA) 1000 pendant drop instrument using two opposing vertical needles. The slenderness ratio (A) is defined as the length of the bridge (L) divided by the diameter of the needle (D). A large slenderness ratio is associated with an unstable bridge. The bridge goes through at least two processes. First the oil is bridged between the opposing needles, suspended in the brine and aged up to one hour. While the bridge is aging, the interfacial elasticity increases and the interfacial tension decreases. There are no disruptions or deformation of the system, and thus the surface stress is equal to the interfacial tension. After aging, the bridge goes under the second process during which the oil comprising the bridge is removed at 0.1 μL/s. This response is tracked until bridge failure. During this process, due to the increase in the elasticity of the interface, an extensional longitudinal and compressive circumferential surface stress contribute to the process. The behavior of the oil when the bridge breaks is indicative of the dominant environment of the oil-water interface—e.g., whether the environment is characteristic of an elastic break or an inelastic break. An enhanced elastic break, resulting from the formation of a thick interface, can appear as pointy interface and can show very little recovery of its initial shape, while a viscous break can reform the initial appearance of the oil before the formation of the bridge as shown in FIGS. 8A-8C. FIG. 8A is an image of the bridge initially before any aging or oil removal. FIG. 8B is an image showing the behavior observed in an inelastic break, and FIG. 8C is an image showing the behavior observed in an elastic break. Increased viscoelasticity suppresses interfacial snap-off and helps to sustain a more continuous oil phase. An elastic bridge is much less prone to break and therefore can pull more volumes of oil out (more production).

The behavior of the bridge is monitored with an APPRO camera at a frame rate of 60 frames per second and its geometry is tracked by measuring the neck diameter (ND). The neck diameter is the lowest radius along the vertical axis. The critical neck diameter (CND) is the value corresponding to the last frame of the connected bridge. The ratio of CND/ND is a stability proxy, and assumptions are made that a value close to zero indicates prevalent elastic forces. All of the unaged systems present an axisymmetric surface stress, while the aged system's stress response varies with the aqueous phase. After the bridge is broken the drops of oil on each needle tip retain the pointy shape in an elastic experiment rather than resuming a drop-like appearance as in an inelastic scenario. This indicates that a more elastic interface can suppress the snap-off effect.

The response of the oil was analyzed for three organic acids (NA14, NA18, and NA10) and the brine (1% $Na_2SO_4$).

The measurements are tracked immediately after one hour of aging time and show different behaviors for each system. FIG. 9 shows images from which the CND for each example system was measured for the unaged example systems determined directly before bridge failure. The bridge formed for NA10 appeared to be inelastic, similar to that shown for $Na_2SO_4$. Based on the viscoelasticity data collected on the AR-G2 rheometer, these results correlate with snap-off times similar to the brine alone. This suggests that NA10 may not maintain connectivity in the reservoir, however emulsion stability data suggests that it would encourage coalescence, and therefore it could work to re-establish this connected phase once it has been lost.

Figure 10:
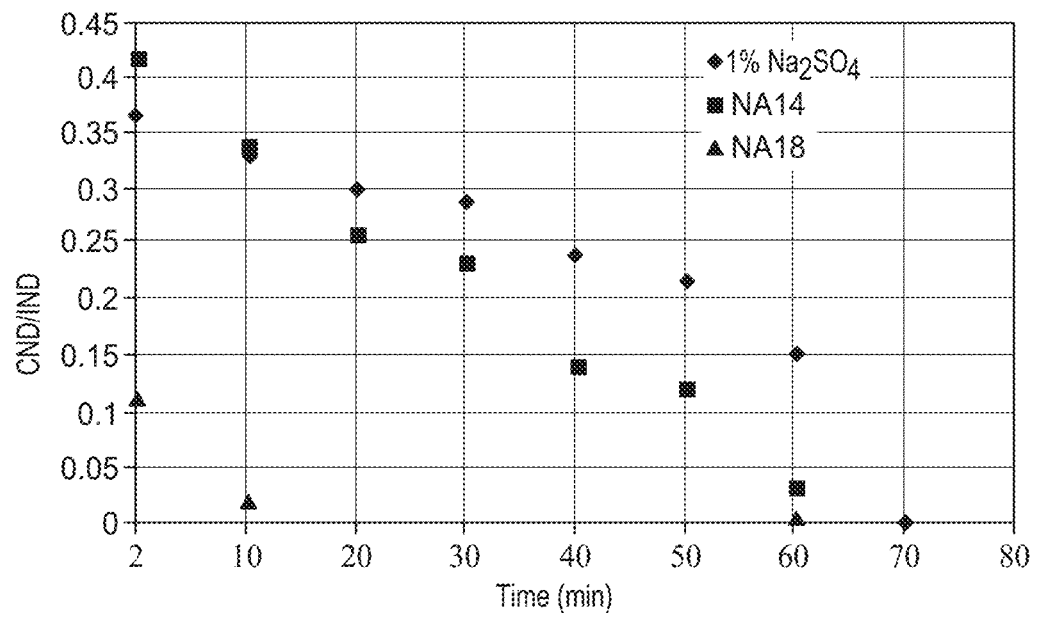
FIG. 10 shows the critical neck diameter (CND) to initial neck diameter (IND) for example acidified brine in oil systems as the systems age according to some embodiments.

The CND was measured for various times between the start and one hour. Some experiments can take a day or more before differences between systems can be observed, but the acids impact the interface rapidly and dramatically. The impact of the acids can be seen by comparing any of the acidic systems to the brine alone (FIG. 9). FIG. 10 shows the difference in bridge behavior and the change in CND for the example systems as each system is aged according to some embodiment. The neck diameter for the smaller acids (NA14 and NA18) and brine in oil at the initial time are very similar as shown in FIG. 10. After 1 hour, the results show statistically different behavior and the systems containing NA14 and NA18 are approaching stability (CND=0). At 1 hour, the stabilization time for the system containing NA18 is short (CND value close to 0), and the stabilization time for the system containing NA14 is significantly lower than the value for the system containing only the low-salinity brine (1% $Na_2SO_4$).

Figure 11A:
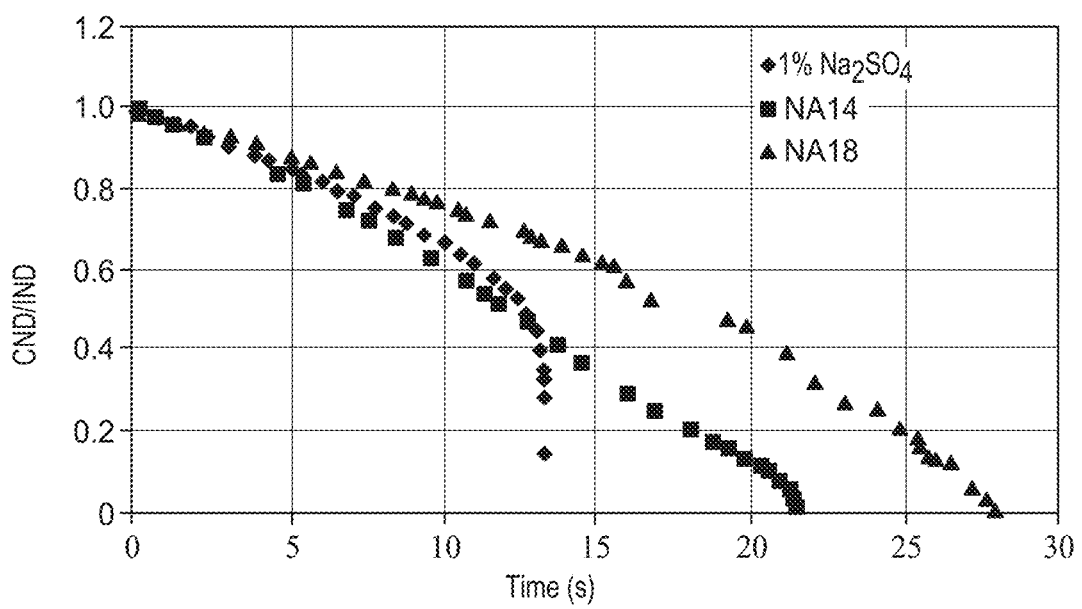
FIG. 11A shows the neck diameter (ND) to IND for example acidified brine in oil systems as the systems age according to some embodiments.
Figure 11B:
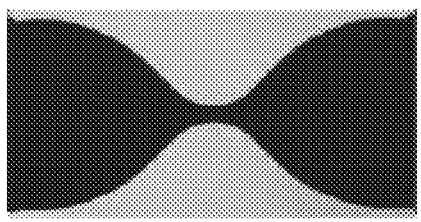
FIG. 11B is an image of the final frame of connection before the bridge fails of an example acidified brine in oil system according to some embodiments.
Figure 11C:
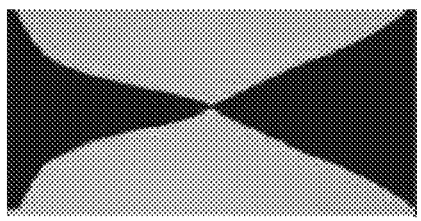
FIG. 11C is an image of the final frame of connection before the bridge fails of an example acidified brine in oil system according to some embodiments.
Figure 11D:
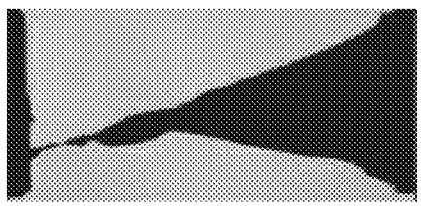
FIG. 11D is an image of the final frame of connection before the bridge fails of an example acidified brine in oil system according to some embodiments.

FIG. 11A shows the neck diameter (ND) to IND for NA14, NA18, and brine in oil as the systems age according to some embodiments. FIGS. 11B-11D show images of the final frame of connection before the bridge fails for the example systems, which is at or close to the 1 hour CND bridge response. FIG. 11B is an image of the 1% Na2SO4 brine in oil system, FIG. 11C is an image of the NA14 in oil system, and FIG. 11C is an image of the NA18 in oil system.

After aging for 1 hour the bridge systems displayed different behaviors compared to the un-aged system as seen in FIGS. 11A and 11B. For the system containing low-salinity brine alone, the CND is much narrower after one hour of aging time (FIGS. 11A-11D) than initially and there is more change in shape before the system undergoes snap-off. When the low-salinity brine system does snap-off, the system exhibits inelastic behavior, while the systems containing the acid show more acute elastic behavior. The system containing NA14—the cyclopentane carboxylic acid that showed an increase in viscoelasticity value and the tan(δ) value starting above 1—shows a distinct difference from the low-salinity brine alone. The shape is still symmetric, but the behavior is very different and has a CND value closer to 0.

As shown in the CND plot for the aged data (FIG. 11A), snap-off is delayed in the case of both the NA14 system and the NA18 system. The NA18 and NA14 system delays snap-off compared to the low-salinity brine system. The NA14 system also shows a more elastic break (FIG. 11C) than the other systems tested. FIG. 11D shows the unusual nature of NA18, in that it sort of appears elastic but different from the elastic results in FIG. 8 (and every other elastic result collected on this instrument to date); NA18 appears to be creating its own asymmetric elastic skin. It should be noted that although NA18 showed a decrease in viscoelasticity, the "skin" enables it to delay snap-off through its own mechanism.

Figure 12:
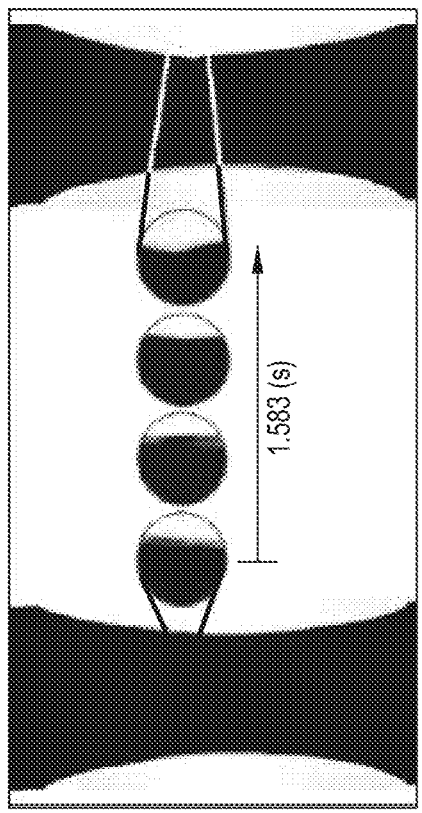
FIG. 12 is an image during bridge deflation for an example acidified brine in oil system after 1 hour of aging according to some embodiments.
Figure 13A:
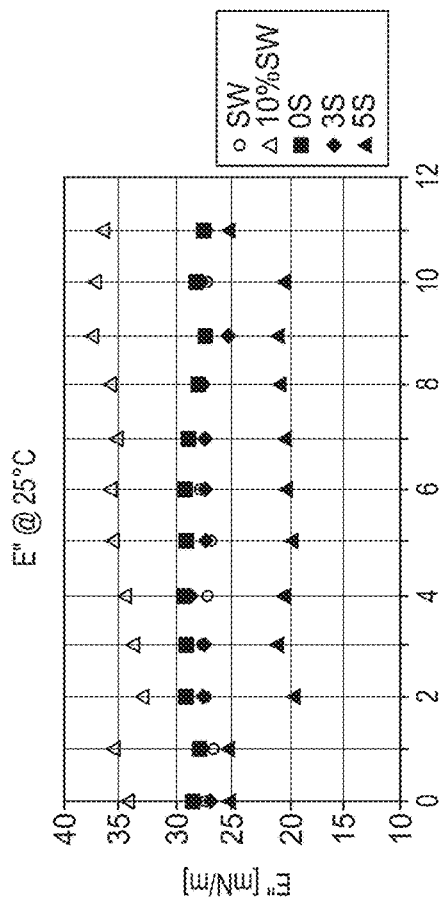
FIG. 13A shows the elastic modulus for example brine solutions in oil at 25° C. according to some embodiments.
Figure 13B:
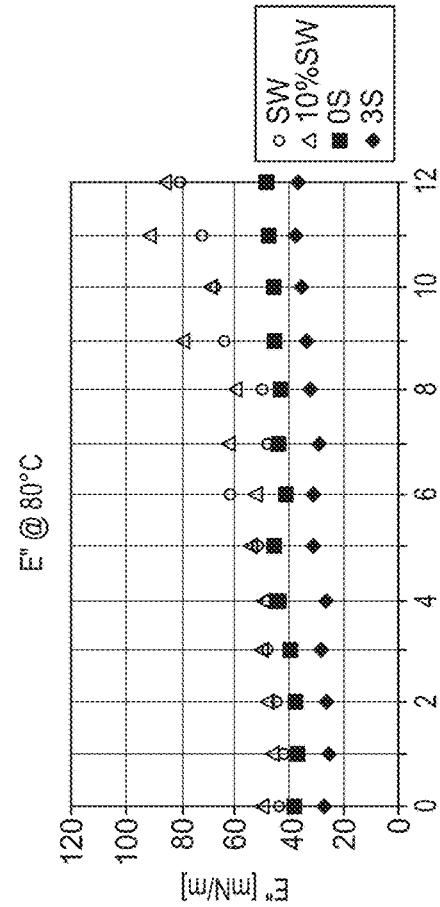
FIG. 13B shows the viscous modulus for example brine solutions in oil at 25° C. according to some embodiments.
Figure 13C:
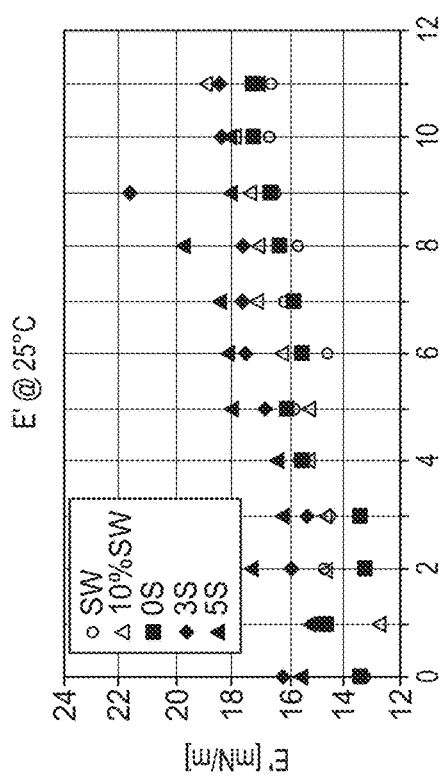
FIG. 13C shows the elastic modulus for example brine solutions in oil at 80° C. according to some embodiments.
Figure 13D:
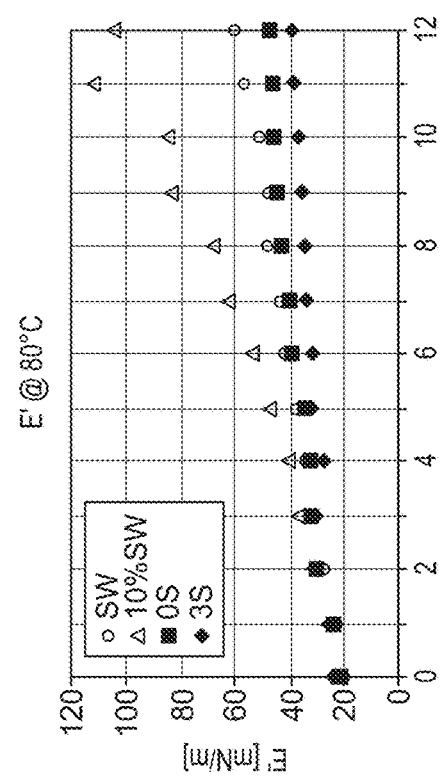
FIG. 13D shows the viscous modulus for example brine solutions in oil at 80° C. according to some embodiments.

The NA18 system (cyclopentane carboxylic acid) showed a drop in elasticity, but this system delays snap-off even longer than the NA14 system. While not being bound by theory, this is likely related to the observed solid-like film (or skin) on the exterior of the bridge that is shown in FIG. 12. The bridge for the NA18 in oil system shows evidence of an interfacial film, strengthening the bridge, and further delaying snap-off, allowing even more oil to be removed before failure.

FIG. 12 shows an image during bridge deflation (e.g., when oil is being removed from the bridge) for the NA18 in oil system after 1 hour of aging, according to some embodiments. 1.583 s is the time lapse between the image on the left (closed line) and the image on the right (arrow). The skin shows wrinkles and a thin-film as the bridge collapses. This region is likely in the non-linear viscoelastic regime and such behavior is unexpected as the other measurements are in the linear viscoelastic regime. If applying external force causes this acid to behave nonlinearly it can be more difficult to predict its behavior. The bulk oil is extracted by the pump leaving the interface comprised of the most polar species in the oil such as asphaltenes and naphthenic acids. This interface allows the bridge to last longer than other systems (FIGS. 11A-11D), as a stronger interface for NA18 is clearly shown. Even though the skin is usually expected to form when the aging time is greater than the stabilization time (CND=0), the solid-like film was visible in the NA18 system after about 10 minutes, making it difficult to determine the stabilization time and therefore producing a drastic and fast drop in the CND as can be seen in FIG. 10. This observation shows that acids are fast-acting and interfacially active.

For the brine system and the NA14 system, the skin was observed after aging the bridges for approximately 24 hours and 12 hours, respectively. In addition, for the brine system and the NA14 system, the aging times were greater than the stabilization times.

The data showed a spike in elasticity for the cyclopentane acid (NA14) while the cyclohexane acids have a detrimental effect on the viscoelasticity. The viscoelasticity data suggests that the cyclohexane acids (NA18 and NA10) may elicit similar responses from the oil, as they both drop the moduli to varying degrees. This difference in behavior between NA18 and NA14 is significant because these two acids show that it is the difference between increasing or decreasing the elasticity. The reparative quality indicates that the acids can encourage coalescence.

The inelastic state of NA10, predicted by the NMR, is represented well by its inelastic bridge. This acid does little to delay snap-off.

Effect of Temperature on Interfacial Viscoelasticity

The effect of temperature on interfacial viscoelastic properties can be evaluated considering only the control brines at various temperatures. As shown below, the interfacial viscoelastic properties clearly increase with increasing temperature. This effect of temperature shows the importance of rheological analysis at high temperature.

A Wyoming crude oil (WG) from a sandy reservoir was used to examine the temperature effects on viscoelasticity. The oil was centrifuged for five hours at 7500 rpm, and filtered with an 11 μm particle retention filter paper to remove traces of water and contaminants. Properties of the WG crude oil at 25° C. include a density of 0.921 g/cc, viscosity of 136.56 cP, pentane-asphaltene content of 9.3 wt %, and refractive index of 1.527. Properties of the WG crude oil at 80° C. include a density of 0.8984 g/cc, a viscosity of 20.7 cP, pentane-asphaltene content of 9.3 wt. % and refractive index of 1.504.

Synthetic brine solutions were prepared by adding analytical grade salts (NaCl, $Na_2SO_4$, $NaHCO_3$, $MgCl_2.6H_2O$, and $CaCl_2.2H_2O$) to deionized (DI) water. Table 4 shows general properties of each brine at 25° C. The seawater (SW) brine modeled from a reservoir in the Gulf of Mexico was used as the reference brine. The synthetic brine OS is seawater devoid of sulfate ions, where the 3S and the 5S brines contain three and five times the sulfate content of the SW brine, respectively. The 10% SW brine corresponds to the SW brine diluted down to 10% by the addition of DI water. The ionic strength is the same for all brines except for the 10% SW brine. All brine and oil samples were placed under vacuum before any interfacial rheology measurements. All of the brines were maintained at atmospheric equilibrium. Mineral precipitation was not observed under experimental conditions.

TABLE 4

| Brines | TDS (ppm) | Density (g/mL) | pH | $SO_4^{2-}$ (ppm) | Ionic Strength (M) |
|---|---|---|---|---|---|
| SW | 35,190 | 1.02259 | 6.96 | 2,900 | 0.65 |
| OS | 36,600 | 1.02121 | 6.68 | — | 0.65 |
| 3S | 33,200 | 1.02553 | 7.00 | 8,700 | 0.65 |
| 5S | 39,670 | 1.02722 | 7.50 | 14,500 | 0.65 |
| 10% SW | 5,460 | 0.99969 | 6.82 | 290 | 0.035 |

TDS is total dissolved solids.

A spinning drop video tensiometer (SVT20) from DataPhysics was used to evaluate the extensional rheology of the oil:brine interface. A droplet of the WG oil is injected into the higher density brine within the capillary tube. The samples for the experiment were a 45:1 mixture of brine in oil. The capillary tube is rotated until a high angular velocity results in an elongated drop shape. The droplet elongates until a balance between tension and centrifugal force exists at the interface. Interfacial tension (IFT) is calculated through optical techniques until a point in time where the IFT has stabilized. The droplet is then subjected to viscoelastic tests where a stress is applied through an oscillating angular velocity. The amplitude of the rotational speed is calculated through prerequisite amplitude tests to ensure the deformation remains within the linear viscoelastic region characteristic of the interface. The amplitude used, given in percent of the steady revolutions per minute (rpm), was 7% at 25° C. and 5% at 80° C. A frequency sweep was also performed, using a frequency of 0.05 Hz. After about 15 oscillation cycles, the IFT evaluated from each video frame is used to calculate the viscoelastic moduli. Oscillation tests are performed every hour for at least 11 hours to evaluate how interfacial viscoelasticity (IFVE) changes with time.

IFVE moduli were measured through extensional rheology using the spinning drop oscillation method. Elastic and viscous moduli are displayed for the WG crude oil in various brines (the SW brine, the OS brine, the 3S brine, the 5S brine, and in the 10% SW brine) at 25° C. and at 80° C. in FIGS. 13A-13D. The interfacial systems at low temperature exhibit more of a viscous behavior for the duration of the experiments. The last points of the low temperature curves suggest that the oil-10% SW brine system, the oil-3S brine system, and the oil-5S brine system have the highest elastic modulus, while the oil-10% SW brine system has the highest viscous modulus.

A shape factor is calculated by a Young-Laplace drop-profile fitting procedure; therefore, a symmetric drop is used for accurate IFT calculation. Although asymmetry was not detected in the oil-SW brine system, the elastic modulus begins to increase at a high rate after 10 hours and the viscous modulus follows a similar trend compared to the oil-10% SW brine system. Of the other brines, the oil-SW brine system yields the highest viscoelasticity. The oil-3S brine system has the lowest viscoelastic moduli. Imbibition results, discussed below, show that the highest oil recovery comes from the interaction of the WG oil and the 3S brine at high temperature. It is possible that a wettability alteration has a greater influence as a mechanism of improved oil recovery being that contact angle results at high temperature show a shift to more water-wetness. Nevertheless, the 3S brine system also exhibited less stable emulsions at 80° C. suggesting increased coalescence and mobilization of fluids.

Each spinning drop experiment is left to rotate for about two hours. This amount of time is sufficient for low temperature experiments, but the IFT continues to change slightly under high temperature conditions. Low temperature results show the change in IFT over the course of each experiment is as follows: a decrease of 4.4% for the oil-SW brine system, an increase of 0.45% for the oil-10% SW brine system, a decrease of 2.7% for the oil-OS brine system, and a decrease of 7.4% for the oil-3S brine system. At high temperature, the oil-3S brine system and the oil-OS brine system exhibit a decrease of 7 and 3.5%, respectively in IFT values over 12 hours, while the oil-SW brine system and the oil-10% SW brine system realized a nearly 11% decrease. The oil-SW brine system and the oil-10% SW brine system utilize increased timescales for IFT stabilization, but this is believed to be caused by an asymmetrical drop shape that results in a large error in IFT calculation.

Curves from FIGS. 13A-13D were normalized by the average interfacial tension (IFT) given after every oscillation test and shown in FIGS. 14A-14D. Although the elastic and viscous moduli curves for low temperature are slightly less overlapping, the oil-10% SW brine system exhibits the lowest E'/IFT trend because of its high IFT. Plots of the normalized elastic and viscous moduli at high temperature show no change in trends from those shown in FIGS. 13A-13D.

Figure 14A:
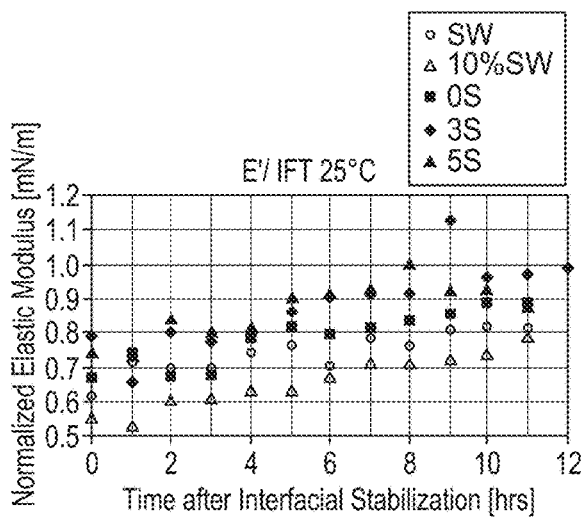
FIG. 14A shows the normalized elastic modulus after each interfacial tension (IFT) for example brine solutions in oil at 25° C. according to some embodiments.
Figure 14B:
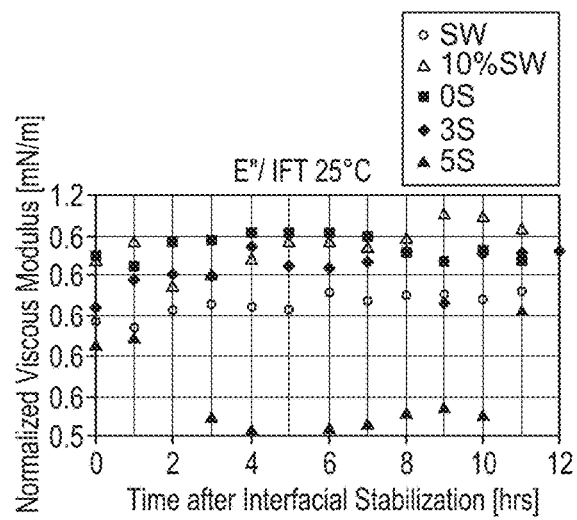
FIG. 14B shows the normalized viscous modulus after each IFT for example brine solutions in oil at 25° C. according to some embodiments.
Figure 14C:
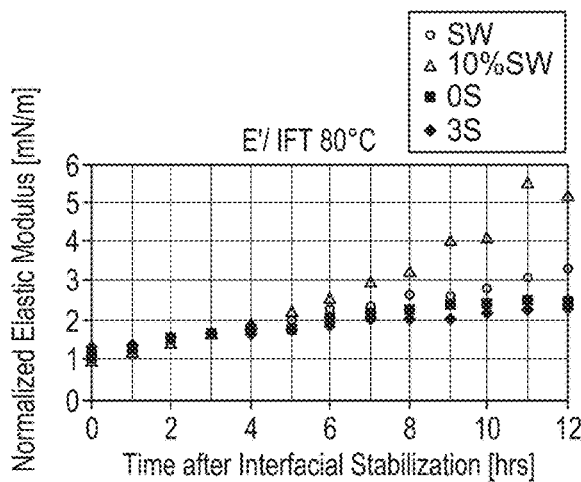
FIG. 14C shows the normalized elastic modulus after each IFT for example brine solutions in oil at 80° C. according to some embodiments.
Figure 14D:
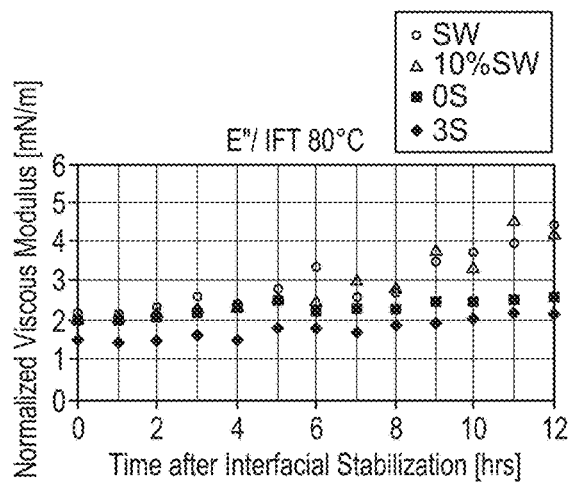
FIG. 14D shows the normalized viscous modulus after each IFT for example brine solutions in oil at 80° C. according to some embodiments.
Figure 14E:
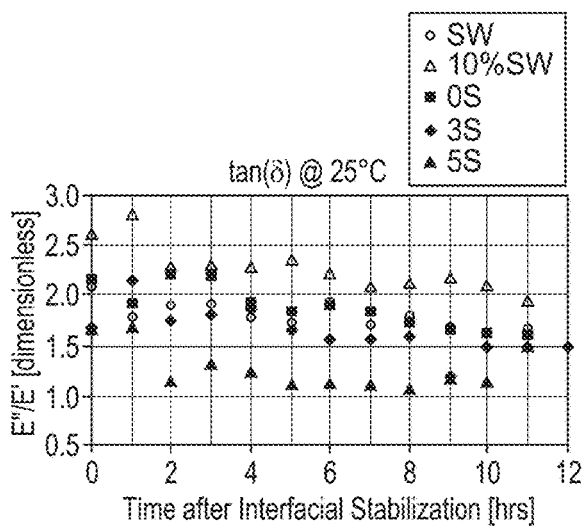
FIG. 14E shows the tangent of the phase angle for example brine solutions in oil at 25° C. according to some embodiments.
Figure 14F:
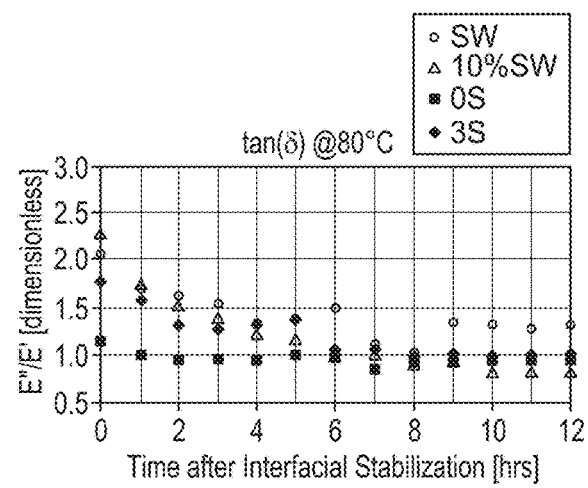
FIG. 14F shows the tangent of the phase angle for example brine solutions in oil at 80° C. according to some embodiments.

The viscoelastic moduli are compared through the use of the phase angle shown in FIGS. 14E and 14F. The viscous modulus clearly dominates interfacial viscoelasticity at low temperature for the oil:brine systems. High temperature results show the 3S brine initiates a more elastic response at short contact times and this elastic-viscous relationship shows little change throughout the experiment. Only the oil-10% SW brine and the oil-3 S brines realized a dominant elastic modulus at high temperature.

Figure 16A:
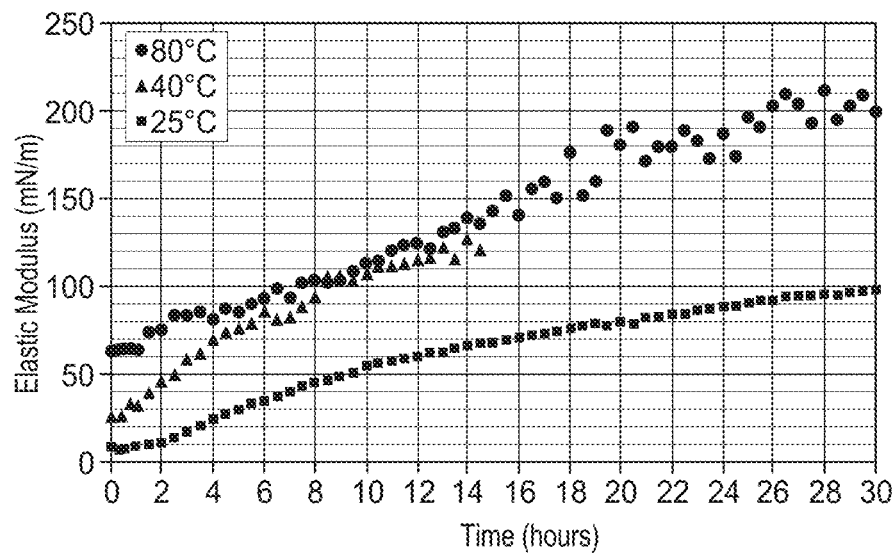
FIGS. 16A and 16B show viscoelasticity results for 1% Na2SO4 with changing temperature according to some embodiments.
Figure 16B:
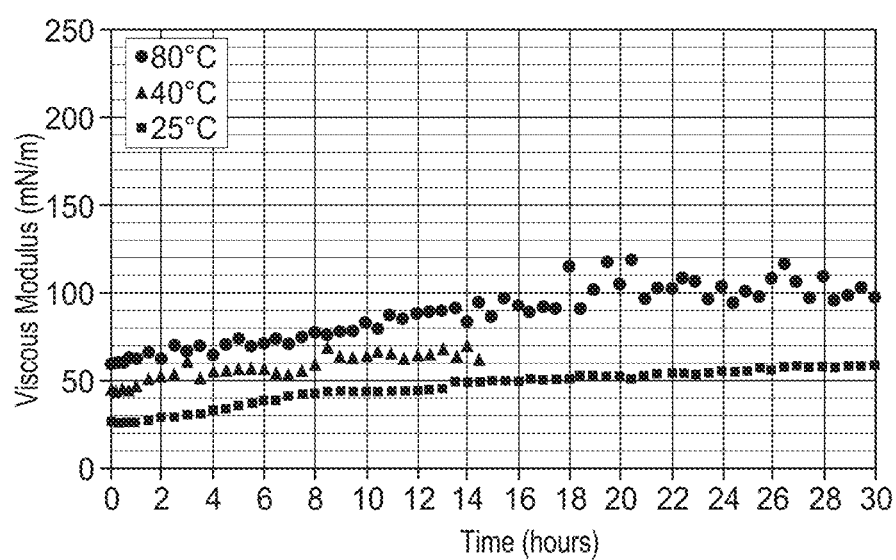

The effect of temperature on IFVE properties can be evaluated considering only the control brine at various temperatures. FIGS. 16A and 16B show the elastic and viscous response to extensional deformation of the control brine and GB oil at 25° C., 40° C., and 80° C. The 40° C. curves are short, but progress between the low and high temperature curves. The steep ascent of the 40° C. elasticity curve is believed to be the result of various interfacial processes initiated by elevated temperature. Interfacial viscoelastic properties clearly increase with increasing temperature.

Figure 16C:
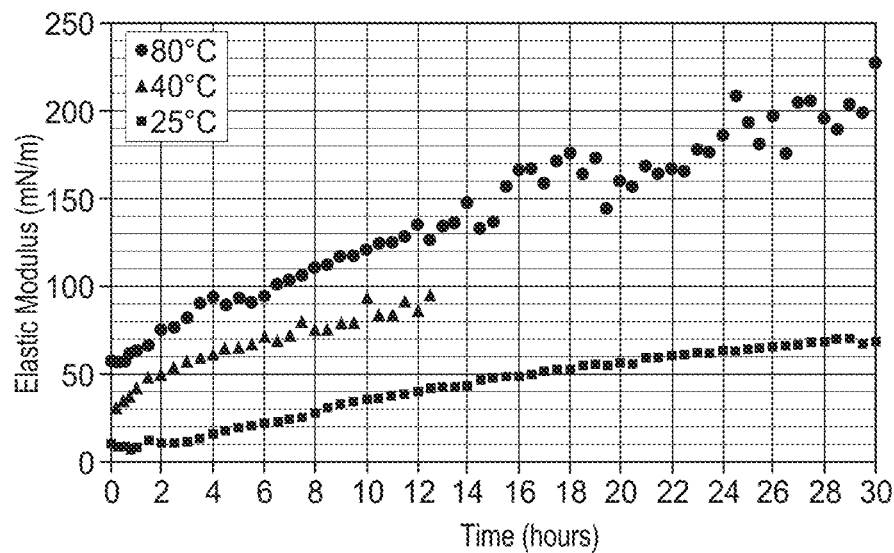
FIGS. 16C and 16D show viscoelasticity results for example acids with changing temperature according to some embodiments.
Figure 16D:
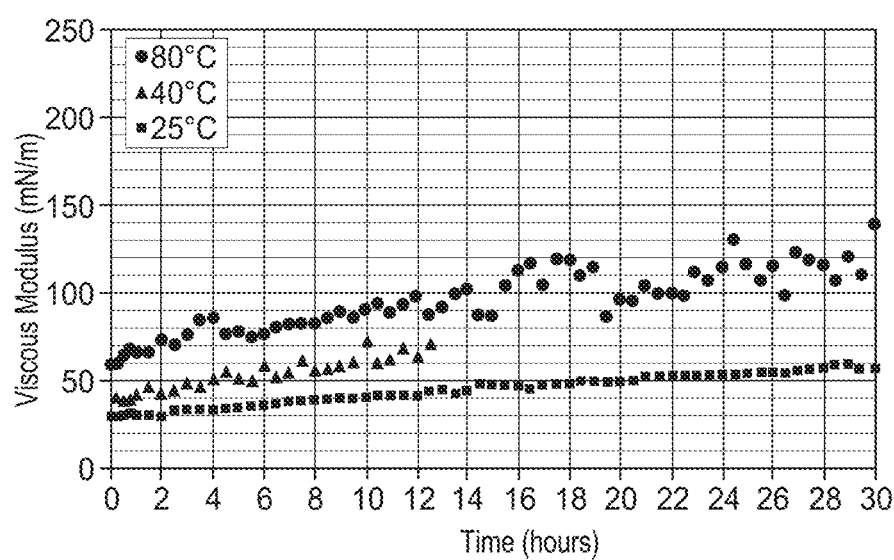
Figure 16E:
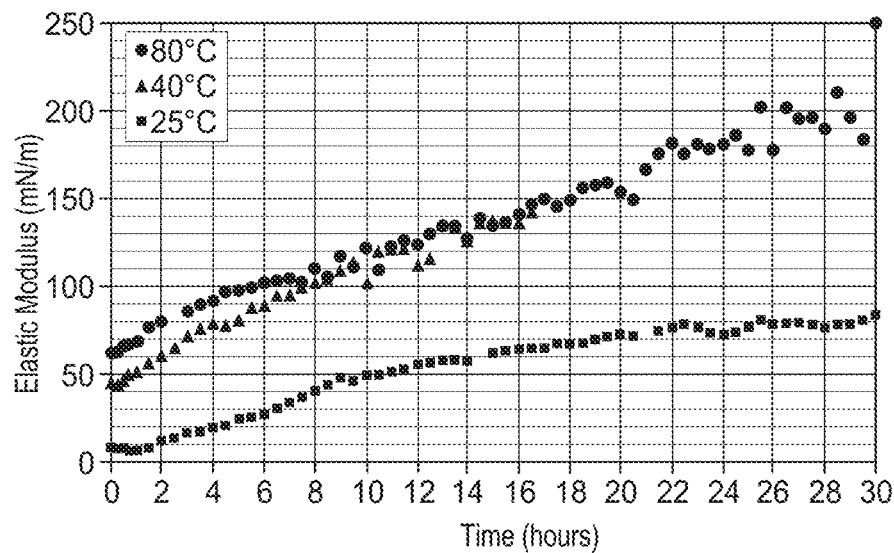
FIGS. 16E and 16F show viscoelasticity results for example acids with changing temperature according to some embodiments.
Figure 16F:
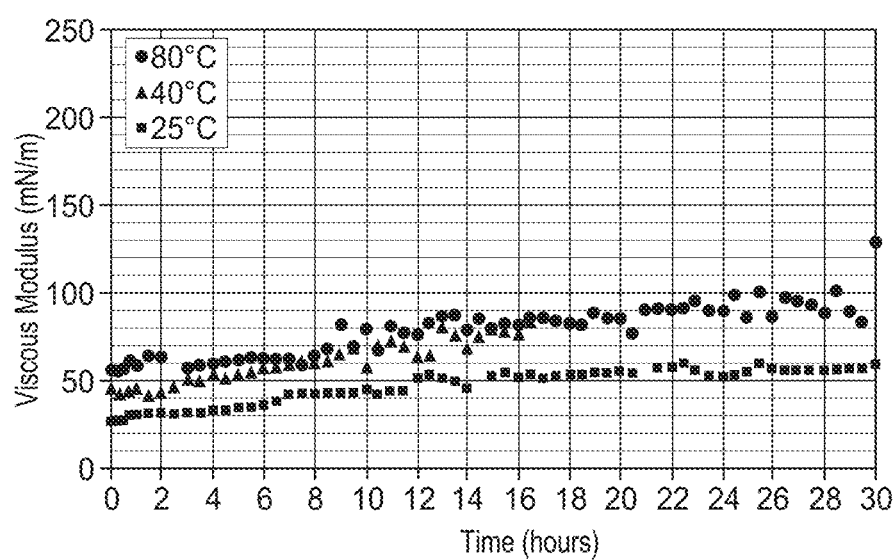

FIGS. 16C and 16D show the elastic and viscous response to extensional deformation of the 1 mM NA10 in 1% $Na_2SO_4$ and GB oil at 25° C., 40° C., and 80° C. The curves for each temperature in these figures are clearly distinct with no overlap and similar slopes. The effect of temperature on the interfacial viscoelasticity can also be seen in FIGS. 16E and 16F showing the 1 mM concentration of NA18 in the control brine (1% $Na_2SO_4$) with GB crude oil at 25° C., 40° C., and 80° C. The 25° C. curves show little change compared to the other aqueous phases tested; however, the 40° C. and 80° C. curves begin to overlap after about 10 hours. The two high temperature curves are still distinct in shape especially when considering the elastic modulus. The change in slope of the curves with temperature may be due to the adsorption kinetics of the interfacially-active molecules. The rate at which asphaltenes adsorb to the interface is likely different from the rate of naphthenic acid adsorption; this effect would certainly affect the shape of the curves. It is also possible that the arrangement of molecules at the interface could be less sterically hindered at lower temperatures. The difference in slope of the elastic moduli at 40° C. in FIGS. 16A and 16E could be due to the rearrangement of molecules to optimally preserve the interfacial structure. Nonetheless, the viscoelastic effects discussed herein also occur at high temperatures.

Imbibition

A vacuum saturation cell at about −40 kPa was first used to vacuum the rock cores for about 12 hours to remove air trapped in the rock cores. The vacuum valve was closed once all air was removed. The oil valve was slowly opened to allow GB crude oil to flow into the cell. The oil was drawn into the cores under reduced pressure. The saturated cores were immersed in a Hastelloy C-276 saturation cell filled with GB oil at about 80° C. for about 14 days. Oil saturation was calculated from mass balance. Saturated cores were carefully placed in Amott cells and then immersed in the experimental brine solutions. Oil in the cores was displaced by the brine solutions through gravity, buoyancy forces, and/or the reduction of capillary forces. Oil recovery volumes were recorded until no more oil was recovered.

Figure 15A:
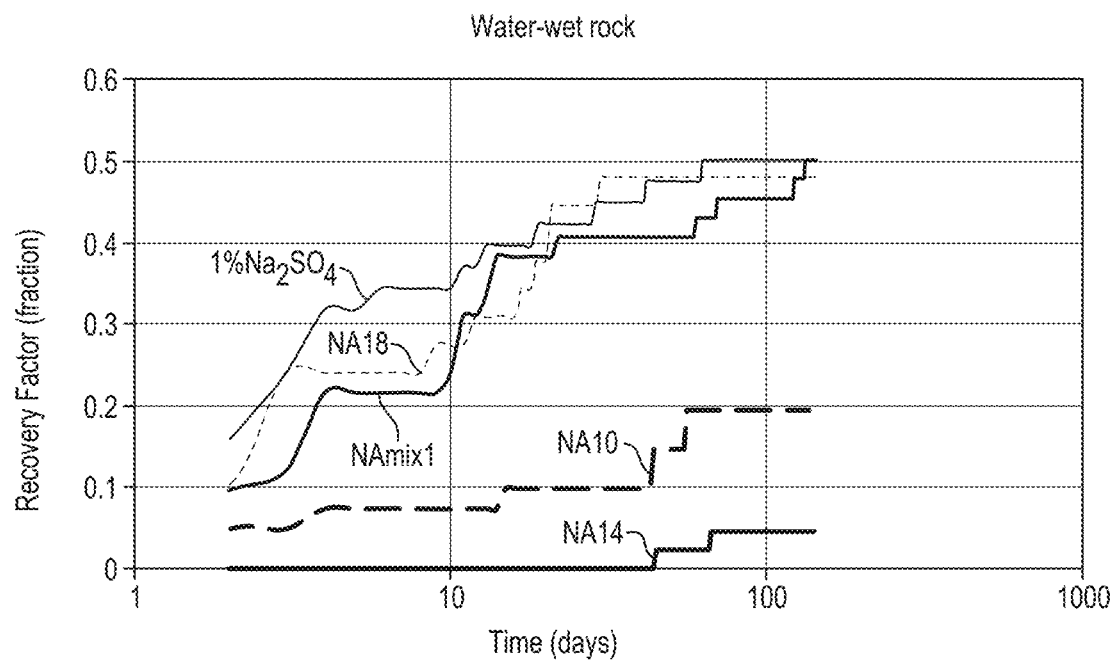
FIG. 15A shows imbibition data for example acids in water-wet rock according to some embodiments.
Figure 15B:
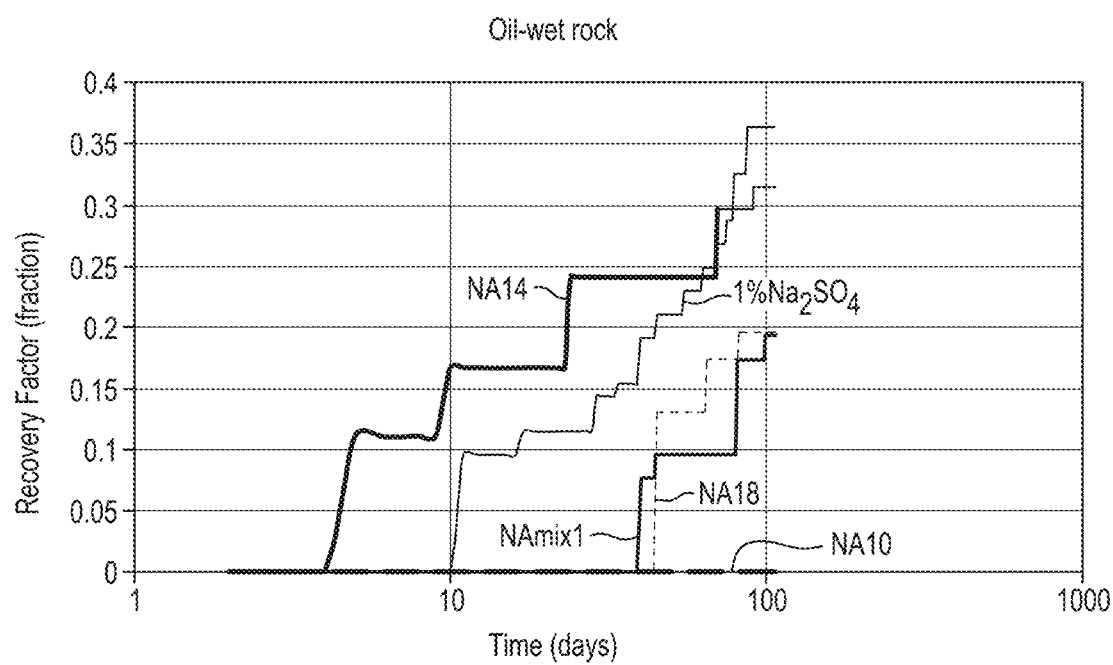
FIG. 15B shows imbibition data for example acids in oil-wet rock according to some embodiments.

FIGS. 15A and 15B show imbibition data for exemplary acids in water-wet rock and oil-wet rock according to some embodiments. In water-wet rock, NA18 and NAmix1 can positively impact the recovery factor (RF). NA14 may also positively impact RF, as it did delay snap-off in the bridge experiments. NA10 showed low elasticity values and showed an inelastic bridge, suggesting that it may not maintain a connected mobile phase, even if it encourages coalescence.

With respect to the oil-wet rock, there is a significant spike from NA14, where it actually recovers more oil than in the water-wet scenario. Additionally, oil is observed from the NA14 example before any of the other systems, suggesting that NA14 changes the wettability to its advantage. This suggests that NA14 may be the most useful in oil-wet reservoirs early on in the process. NA18 and NAmix1 show similarly steep slopes, however at a later time in the game. Applying NA14 early on in the process and then switching to NA18 may be a viable recipe, in some embodiments, for improved recovery factor in situ.

Embodiments described herein indicate that injection of organic acids (e.g., naphthenic acids and similar structures) enhance oil recovery. The structural specifics of each organic acid can be a factor in interfacial behavior. Dramatic differences can be observed with such small differences in the organic acids (e.g., naphthenic acids and other acids), such as by one or two $CH_2$ groups.

The small cyclohexanes, such as NA10 and NA18, can work to decrease the viscoelastic moduli (G' and G"), though NA18 does so more strongly. NA18 is the most water soluble acid which surprisingly exhibits a dramatic decrease in observed viscoelasticity. This is surprising because NA18 is highly water soluble which is not typically indicative of oleophillic behavior, and it was unexpected that NA18 would cause such significant changes in the interfacial behavior. The degree to which the G' and G" moduli decrease is concentration dependent, but G' and G" plateau at a concentration at which the acid is believed to form aggregates, such as above 2.5 mM for NA18. While not being bound by theory, it is believed that the diminution may be related to how the acids sterically interact with the interface. The steric interaction between NA18 and the molecules comprising the interface (e.g., asphaltenes) could lay flat or perpendicularly, or intercalate to a certain degree. The steric orientation is likely related to both the interfacial effects and the structure of the acid.

NA18 and NA10 are likely to interact with the interface similarly, though it is believed that NA10 does so to a lesser degree, according to the decreased interfacial effects. NA10 does not decrease the individual moduli to the same extent as NA18, but NA10 softens to the same degree as NA18 when the tan($\delta$) is analyzed. On day 5, the largest change in $d_3$, or most coalesced system, is NA18, though this may indicate a stable diameter for the system as it does not continue to appreciably increase between day 5 and 14. NA10 has the opposite time dependence, where it is the least stable mono-acid system at the end of the 14 days, but is more stable than the brine on day 5. Thus, time may be a parameter for any emulsion behavior.

NA12 (an aromatic NA) was analyzed to observe behavior of aromatic acids at the water-oil interface and their effects on emulsion stability. While not being bound by theory, it is believed that with an oil-in-water emulsion, the aromatic species may be wedged into the interface as deeply as possible in an attempt to get to the water phase. This indicates the acids that decrease the viscoelasticity the most, e.g., NA18 and NA12, are both the most water soluble. These water-soluble species are not believed to stabilize emulsions compared to the brine alone. NA12 does not stop droplet breakup, based on the increase in polydispersity, and the droplets do not show evidence of coalescence through an increase in diameter. This is surprising as NAmix1 exhibits similar interfacial damping behavior to NA12, but dissimilar coalescence behavior to NA12. The asphaltenes are also typically understood to be aromatic; therefore, the aromatic acid may have a unique trend based on unique interactions with the polar interface.

Both NA14 and L-proline (cyclopentane-type structures) exhibit healing behavior when tested for viscoelasticity and similar emulsion stability behavior. Both cyclopentane-type structures stabilized emulsions compared to 1% $Na_2SO_4$, and the emulsions with NA14 were some of the most stable. This indicates the impact of shear in emulsion formation, as the initial droplets of the cyclopentane-type structures were apparently stable as the change was minimal despite the interfacial healing that NA14 and L-proline demonstrate.

NAmix1 shows behaviors exhibited by amphiphiles in that NAmix1 produces the most stable/monodisperse emulsions on day 1, but shows the largest change in a and increase in diameter on day 14. The increase in median diameter indicates increased coalescence, and the polydispersity increases mobilization of fluids through the media. The time dependence of fluid-fluid interactions is also evident, as destabilization effects varied with time. The NAmix1 shows the most extreme change in aqueous acid concentration, pH, and viscoelasticity, which may result from the variety of species present in NAmix1. The decrease in viscoelasticity is accompanied by behavior indicative of interfacial healing. Combining the healing behavior with emulsion stability, it is believed that NA10 and NA14, or at least similar structural classes, are present and acting in the NAmix1. The behaviors observed by NA18 seem to plateau when the acids present form aggregated species. If a lower concentration, such as NAmix1 in an aggregated state at 1 wt %, can elicit the same viscoelastic and emulsion destabilizing response, it is believed that a less corrosive environment can be utilized to increase recovery factor.

The viscoelasticity data suggests that NA14 can increase coalescence and reduce snap-off. The TD-NMR data does not indicate that this increase causes much of a change to the stability of the emulsions over time compared to either NA18 or the low-salinity brine alone. The bridge experiments show the elastic nature of the interface formed between the oil and the NA14. NA14 delays snap-off compared to the low-salinity brine, enabling more oil to be transferred through the bridge before failure. NA14 also reaches a CND near zero, confirming the strength of the interface.

NA18 is readily soluble in water, but that did not prevent it from halving the elasticity values of 1% $Na_2SO_4$. While acids typically drop the viscoelasticity of interfaces, this is often linked to decreasing the oil recovery. In this instance, the inventors have unexpectedly found that NA18 delayed bridge failure the longest, even though the behavior is not classically elastic as observed for NA14. This is unexpected because there was not a 1:1 correlation. The bridge for the NA18 in oil system shows evidence of an interfacial film, strengthening the bridge, and further delaying snap-off, allowing even more oil to be removed before failure. The film for the NA18 in oil system is believed to display plastic behavior, in that the bridge shows rigid behavior under conditions of low disturbance but more viscous behavior under higher stress conditions.

NA10 shows viscoelasticity behavior between NA18 and the low-salinity brine, which results in an unstable emulsion. NA18 was resistant to coalescence. If the resistance to coalescence could be linked to increased snap-off, that may explain the emulsion destabilization of NA10.

Combinations of acids can also be used both to maintain connectivity but also to reconnect ganglia after recovery has plateaued. That is, some acids can be used to delay snap-off/maintain connectivity and mobility as long as possible, and some (e.g., the cyclopentane type) could work to re-establish connectivity once it has been lost, as suggested by the reparative tendencies they have shown in the ARG2/viscoelasticity results.

Other non-limiting aspects and/or embodiments of the present disclosure can include:

A1. A hydrocarbon recovery material, comprising an organic acid and a water material.

A2. The hydrocarbon recovery material of paragraph A1, wherein the organic acid comprises a naphthenic acid.

A3. The hydrocarbon recovery material of paragraph A1 or paragraph A2, wherein the organic acid comprises cyclopentane carboxylic acid, L-proline, cyclohexane carboxylic acid, 3-cyclohexane propionic acid, p-toluic acid, a naphthenic acid, or a combination thereof.

A4. The hydrocarbon recovery material of any of paragraphs A1-A3, wherein the organic acid is selected from the group consisting of cyclopentane carboxylic acid, cyclohexane carboxylic acid, 3-cyclohexane propionic acid, and a combination thereof.

A5. The hydrocarbon recovery material of any of paragraphs A1-A4, wherein a concentration of the organic acid is about 10 mM or less.

A6. The hydrocarbon recovery material of any of paragraphs A1-A5, wherein a concentration of the organic acid is about 2 mM or less.

A7. The hydrocarbon recovery material of any of paragraphs A1-A6, wherein the water material has a salinity of about 100,000 ppm or less.

A8. The hydrocarbon recovery material of any of paragraphs A1-A6, wherein the water material has a salinity of from about 5,000 ppm to about 100,000 ppm.

A9. The hydrocarbon recovery material of any of paragraphs A1-A6, wherein the water material has a salinity of from about 500 ppm to about 5,000 ppm.

A10. The hydrocarbon recovery material of any of paragraphs A1-A6, wherein the water material is a smart water.

A11. The hydrocarbon recovery material of paragraph A10, wherein the water material has a salinity of from about 40,000 ppm to about 200,000 ppm.

A12. The hydrocarbon recovery material of any of paragraphs A1-A6, wherein the water material is a sulfate-enriched water, a calcium enriched water.

B1. An oil recovery method, comprising injecting a treatment fluid into a reservoir under reservoir conditions, the reservoir containing hydrocarbons.

B2. The method of paragraph B1, further comprising mixing an organic acid and a water material to form a treatment fluid.

B3. The method of paragraph B1 or paragraph B2, wherein the treatment fluid comprises the hydrocarbon recovery material of any of paragraphs A1-A12.

B4. The method of any of paragraphs B1-B3, wherein the reservoir conditions include a temperature of the reservoir of from about 10° C. to about 250° C.

B5. The method of any of paragraphs B1-B4, wherein the reservoir conditions include a temperature of the reservoir of from about 15° C. to about 150° C.

B6. The method of any of paragraphs B1-B5, wherein the reservoir conditions include a temperature of the reservoir of from about 20° C. to about 120° C.

B7. The method of any of paragraphs B1-B6, wherein the reservoir conditions include a pressure of the reservoir of from about 0 psi to about 15,000 psi.

B8. The method of any of paragraphs B1-B7, wherein the reservoir conditions include a pressure of the reservoir of from about 300 psi to about 10,000 psi.

B9. The method of any of paragraphs B1-B8, further comprising removing hydrocarbons from the reservoir.

C1. An oil recovery method, comprising injecting a treatment fluid into a reservoir containing hydrocarbons, the treatment fluid comprising an organic acid in one or more of an oil-in-water emulsion, a resin dispersion, or a polymer capsule.

C2. The method of paragraph C1, further comprising encapsulating the organic acid in one or more of the oil-in-water emulsion, the resin dispersion, or the polymer capsule.

C3. The method of paragraph C1 or paragraph C2, wherein the organic acid comprises a naphthenic acid.

C4. The method of any of paragraphs C1-C3, wherein the organic acid comprises cyclopentane carboxylic acid, L-proline, cyclohexane carboxylic acid, 3-cyclohexane propionic acid, p-toluic acid, a naphthenic acid, or a combination thereof.

C5. The method of any of paragraphs C1-C4, wherein the organic acid is selected from the group consisting of cyclopentane carboxylic acid, cyclohexane carboxylic acid, 3-cyclohexane propionic acid, and a combination thereof.

C6. The method of any of paragraphs C1-05, wherein a concentration of the organic acid in the treatment fluid is about 10 mM or less.

C7. The method of any of paragraphs C1-C6, wherein a concentration of the organic acid in the treatment fluid is about 2 mM or less.

C8. The method of any of paragraphs C1-C7, wherein the injection is performed under reservoir conditions, the reservoir conditions comprising a temperature of the reservoir of from about 10° C. to about 250° C. and a pressure of the reservoir of from about 0 psi to about 15,000 psi.

C9. The method of C8, wherein the reservoir conditions include a temperature of the reservoir of from about 10° C. to about 250° C.

C10. The method of paragraph C8 or paragraph C9, wherein the reservoir conditions include a temperature of the reservoir of from about 15° C. to about 150° C.

C11. The method of any of paragraphs C8-C10, wherein the reservoir conditions include a temperature of the reservoir of from about 20° C. to about 120° C.

C12. The method of any of paragraphs C8-C11, wherein the reservoir conditions include a pressure of the reservoir of from about 0 psi to about 15,000 psi.

C13. The method of any of paragraphs C8-C12, wherein the reservoir conditions include a pressure of the reservoir of from about 300 psi to about 10,000 psi.

C14. The method of any of paragraphs C1-C13, further comprising removing hydrocarbons from the reservoir.

C15. The method of any of paragraphs C2-C14, wherein encapsulating the organic acid in the oil-in-water emulsion comprises adding the organic acid to an oil to form a mixture; and adding the treatment fluid to the mixture to form an oil-in-water emulsion.

C16. The method of any of paragraphs C2-C15, wherein encapsulating the organic acid in the resin dispersion comprises adding the organic acid to a resin to form resin dispersion.

C17. The method of any of paragraphs C2-C16, wherein encapsulating the organic acid in the polymer capsule comprises adding the organic acid to a polymer and a crosslinker to form a polymer capsule.

C18. The method of paragraph C1-C17, wherein the treatment fluid further comprises a water material.

C19. The method of any of paragraphs C16-C18, further comprising adding the resin dispersion, the polymer capsule, or a combination thereof to the water material to form the treatment fluid.

C20. The method of any of paragraphs C1-C19, wherein the water material has a salinity of about 100,000 ppm or less.

C21. The hydrocarbon recovery material of any of paragraphs C1-C20, wherein the water material has a salinity of from about 5,000 ppm to about 100,000 ppm.

C22. The hydrocarbon recovery material of any of paragraphs C1-C21, wherein the water material has a salinity of from about 500 ppm to about 5,000 ppm.

C23. The hydrocarbon recovery material of any of paragraphs C1-C22, wherein the water material is a smart water.

C24. The hydrocarbon recovery material of paragraph C23, wherein the water material (e.g., the smart water) has a salinity of from about 40,000 ppm to about 200,000 ppm.

C25. The hydrocarbon recovery material of any of paragraphs C1-C24, wherein the water material is a sulfate-enriched water, a calcium enriched water.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

All documents described herein are incorporated by reference herein, including any priority documents and/or testing procedures to the extent they are not inconsistent with this text. As is apparent from the foregoing general description and the specific embodiments, while forms of this disclosure have been illustrated and described, various modifications can be made without departing from the spirit and scope of this disclosure. Accordingly, it is not intended that this disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While this disclosure has been described with respect to a number of embodiments and examples, those skilled in the art, having benefit of this disclosure, will appreciate that other embodiments can be devised which do not depart from the scope and spirit of this disclosure.

What is claimed is:

1. An oil recovery method, comprising:
injecting a waterflooding treatment fluid into a reservoir containing hydrocarbons, the waterflooding treatment fluid comprising an organic acid in a resin dispersion, the waterflooding treatment fluid further comprising water, the organic acid comprising one or more naphthenic acids; and
producing hydrocarbons from the reservoir.

2. The method of claim 1, further comprising encapsulating the organic acid in the resin dispersion to form the waterflooding treatment fluid.

3. The method of claim 1, wherein a concentration of the organic acid in the waterflooding treatment fluid is about 10 mM or less.

4. The method of claim 1, wherein the organic acid comprises one or more cycloalkane carboxylic acids.

5. The method of claim 1, further comprising dispersing the resin dispersion in the water.

6. The method of claim 1, wherein a concentration of the organic acid in the resin dispersion is about 10,000 mM or less.

7. The method of claim 6, wherein the concentration of the organic acid in the resin dispersion is about 1,000 mM or less.

8. The method of claim 7, wherein the water has a salinity of about 100,000 ppm or less.

9. The method of claim 1, wherein the one or more naphthenic acids comprises:

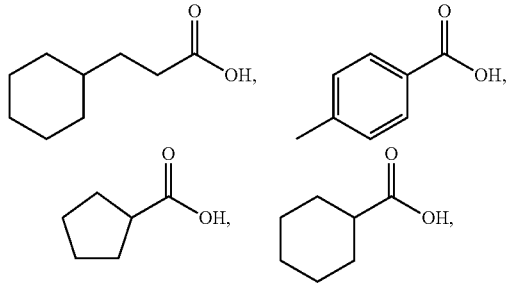

or a combination thereof.

10. An oil recovery method, comprising:
injecting a treatment fluid into a reservoir containing hydrocarbons, the treatment fluid comprising one or more naphthenic acids in a resin dispersion, the treatment fluid further comprising water, the treatment fluid injected at a pressure below a fracturing pressure; and
producing hydrocarbons from the reservoir.

11. The method of claim 10, wherein the one or more naphthenic acids comprises:

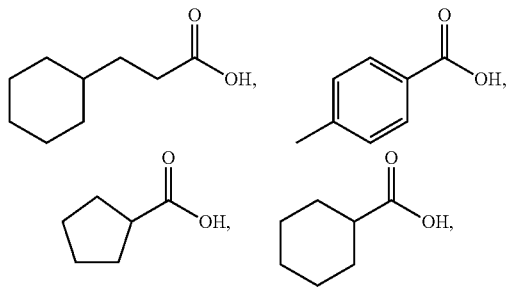

or a combination thereof.

12. The method of claim 10, wherein a concentration of the one or more naphthenic acids in the treatment fluid is about 10 mM or less.

13. The method of claim 10, wherein a concentration of the one or more naphthenic acids in the treatment fluid is about 2 mM or less.

14. The method of claim 10, further comprising dispersing the resin dispersion in the water.

15. The method of claim 10, wherein a concentration of the one or more naphthenic acids in the resin dispersion is about 10,000 mM or less.

16. The method of claim 15, wherein the concentration of the one or more naphthenic acids in the resin dispersion is about 1,000 mM or less.

17. The method of claim 16, wherein the water has a salinity of about 100,000 ppm or less.

18. An oil recovery method, comprising:
injecting a treatment fluid into a reservoir containing hydrocarbons to stimulate production from the reservoir, the treatment fluid comprising one or more naphthenic acids in a resin dispersion, the treatment fluid further comprising water and the one or more naphthenic acids comprising:

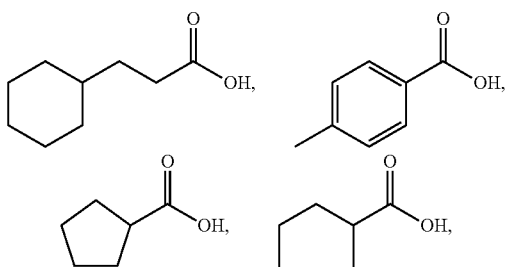

or a combination thereof; and producing hydrocarbons from the reservoir.

19. An oil recovery method, comprising:

injecting a waterflooding treatment fluid into a reservoir containing hydrocarbons, the waterflooding treatment fluid comprising an organic acid in a resin dispersion, the waterflooding treatment fluid further comprising water, the organic acid comprising one or more cycloalkane carboxylic acids; and producing hydrocarbons from the reservoir.

20. An oil recovery method, comprising:

injecting a waterflooding treatment fluid into a reservoir containing hydrocarbons, the waterflooding treatment fluid comprising an organic acid in a resin dispersion, the waterflooding treatment fluid further comprising water, the organic acid comprising one or more naphthenic acids, the one or more naphthenic acids comprising:

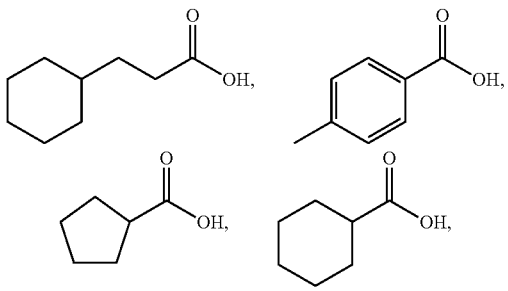

or a combination thereof; and producing hydrocarbons from the reservoir.

\* \* \* \* \*